United States Patent
Endo et al.

(10) Patent No.: US 7,336,304 B2
(45) Date of Patent: Feb. 26, 2008

(54) DIGITAL CAMERA WITH ZOOM LENS

(75) Inventors: Hiroshi Endo, Asaka (JP); Michio Cho, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 580 days.

(21) Appl. No.: 10/921,939

(22) Filed: Aug. 20, 2004

(65) Prior Publication Data
US 2005/0041140 A1   Feb. 24, 2005

(30) Foreign Application Priority Data
Aug. 22, 2003  (JP) ............................. 2003-298083
Dec. 19, 2003  (JP) ............................. 2003-423617

(51) Int. Cl.
| H04N 5/262 | (2006.01) |
| H04N 5/225 | (2006.01) |
| G03B 13/00 | (2006.01) |
| G03B 17/00 | (2006.01) |
| G02N 15/14 | (2006.01) |

(52) U.S. Cl. ................... 348/240.3; 348/335; 348/345; 396/72; 359/691

(58) Field of Classification Search ............ 348/240.3, 348/240.99; 359/691; 396/72
See application file for complete search history.

(56) References Cited

U.S. PATENT DOCUMENTS

| 4,917,482 | A | * | 4/1990 | Ito ............................... 359/690 |
| 5,241,421 | A | * | 8/1993 | Endo et al. .................. 359/692 |
| 5,422,699 | A | * | 6/1995 | Sato et al. .................... 396/82 |
| 5,541,772 | A | * | 7/1996 | Lin .............................. 359/692 |
| 5,642,231 | A | * | 6/1997 | Estelle ......................... 359/692 |
| 5,663,836 | A | * | 9/1997 | Ogata .......................... 359/691 |
| 5,710,669 | A | * | 1/1998 | Endo ........................... 359/686 |
| 5,734,510 | A | * | 3/1998 | Ito ............................... 359/691 |
| 6,545,714 | B1 | * | 4/2003 | Takada ........................ 348/335 |
| 6,807,015 | B2 | * | 10/2004 | Eguchi et al. .............. 359/690 |
| 6,853,807 | B2 | * | 2/2005 | Hagimori et al. ........ 348/240.3 |
| 6,931,207 | B2 | * | 8/2005 | Nanba .......................... 396/72 |
| 2001/0043405 | A1 | | 11/2001 | Eguchi et al. |

FOREIGN PATENT DOCUMENTS

JP    2001-281522 A    10/2001

\* cited by examiner

*Primary Examiner*—Nhan T. Tran
(74) *Attorney, Agent, or Firm*—Sughrue Mion, PLLC

(57) ABSTRACT

A zoom lens including front and rear elements, the front elements is set up so that the front elements are disposed at a position to satisfy the formula:

$$T_1 \geq Ha_1 + HH_1 + L + HH_2 + \frac{f_2(f_1 - L)}{f_1 + f_2 - L} + \frac{f_1^2}{m - f_1},$$

where a length from the top of the front elements on the optical axis to the front main point of the front elements: $Ha_1$, a main point of the front elements: $HH_1$, a length from the rear main point of the front elements to the front main point of the rear elements: L, a main point of the rear elements: $HH_2$, a focal length of the front elements: $f_1$, a focal length of the rear elements: $f_2$, a length from the object at the time of photography to the front main point of the front elements: m, and a length from the top of the front elements on the optical axis to the imaging plane: $T_1$.

16 Claims, 17 Drawing Sheets

DIGITAL CAMERA WITH ZOOM LENS

BACKGROUND OF THE INVENTION

1. Field of the Invention

The present invention relates to a zoom lens of two elements, a so-called retrofocus type, which comprises a front elements lens and a rear elements lens, wherein the front elements lens has a negative refractivity and the rear elements lens has a positive refractivity, and an image taking apparatus having the zoom lens as mentioned above.

2. Description of the Related Art

A zoom lens is classified broadly into a telephoto type having positive and negative refractive powers in sequence from the object side and a retrofocus type having negative and positive refractive powers in sequence from the object side. The two elements-retrofocus type of zoom lens has the following aspects as compared with the telephoto type.

(a) Fluctuations of F No. by zooming are small.
(b) Accuracy in a lens position is not severe.
(c) Peripheral light quantity at the wide-angle side is much.

Further, the retro focus type of zoom lens has an aspect set forth below.

(d) Incident angle to an imaging plane is small, even if the wide-angle edge is concerned with.

Particularly, with respect to the aspect of the item (d), it is a preferable advantage for a zoom lens, which is incorporated into a digital camera wherein solid state imaging devices such as CCD and MOS are arranged on an imaging plane. For this reason, there is a tendency that a digital camera adopts a retrofocus type of zoom lens.

On the other hand, the retrofocus type of zoom lens is associated with problems as set forth below.

According to the retrofocus type of zoom lens, of any one of lens elements after two elements, there exist lens elements (including direct magnification (lateral magnification: 1)), in which the lateral magnification for the infinite-object vary via the direct magnification, or extending over the low magnification less than the direct magnification and the high magnification exceeding the direct magnification, in accordance with the change of the focal length of the whole system by zooming. The lens elements including the direct magnification cannot be used as focusing lens elements at the area near the direct magnification or the direct magnification neighbor area of the zooming area.

Hereinafter, there will be explained the conventional example of a two elements-retrofocus type of zoom lens. In this example, the rear elements lens corresponds to lens elements including the direct magnification, since the two elements are concerned. Thus, it will be indicated that an arrangement of the rear elements makes it difficult to implement focusing in the direct magnification neighbor area.

FIG. 1 is an explanatory view of symbols used in the specification.

Here, lens elements illustrated at the left side of FIG. 1 are front elements 11 having a negative refractive power (the focal length is minus). And lens elements illustrated at the right side of FIG. 1 are rear elements 12 having a positive refractive power (the focal length is plus). Here, it is assumed that the "lens elements" include a case where the "lens elements" comprise only one piece of lens.

Here, there is assumed a digital camera in which a solid state imaging device such as a CCD imaging device is used to catch a subject image so as to generate image data. In FIG. 1, in addition to the zoom lens comprising the front elements 11 and the rear elements 12, there are shown a solid state imaging device 14 arranged in such a manner that a light receiving plane is coincident with an imaging plane 13, a cover glass 15 disposed in front of the light receiving plane of the solid state imaging device 14, and a low-pass filter 16 disposed in front of the cover glass 15. Further FIG. 1 shows an optical member having an effect on an optical path length, but omits mechanical shutter and an aperture member in illustration.

According to the digital camera, a subject light incoming via the zoom lens comprising the front elements 11 and the rear elements 12 is image-formed on the imaging plane 13 in which the light receiving plane of the solid state imaging device 14 is disposed, and the subject image formed on the imaging plane 13 is converted into an electric signal by the solid state imaging device 14.

Here, the symbols are defined as follows. Incidentally, it is noted that the definition is effective through the specification in its entirety. Further it is noted that the values are associated with the temperature variations, and the computing equations are computed using the associated values under the environment.

(a) A length from the top of the front elements on the optical axis to the front side main point of the front elements: $Ha_1$ (b) A main point interval of the front elements: $HH_1$ (c) A length from the rear side main point of the front elements to the front side main point of the rear elements where the air conversion is carried out on the optical member not included in the front elements and the rear elements: L Where the length L is determined in a condition that the subject of the infinite-point is focused.

(d) A main point interval of the rear elements: $HH_2$ (e) A length from the top of the rear elements on the optical axis to the front side main point of the rear elements: $Ha_2$ (f) A focal length of the front elements: $f_1$ (minus)

(g) A focal length of the rear elements: $f_2$ (plus)

(h) A focal length of the whole system 10 comprising the front elements and the rear elements in zoom positions where the air conversion is carried out on the optical member interposed between the front elements and the rear elements: f (plus)

Incidentally, since the front elements and the rear elements are varied in relative length in accordance with the zoom position, the focal length f of the whole system 10 is a variable varying in accordance with the zoom position.

(i) A length from the subject at the time of near photography to the front side main point of the front elements where the air conversion is carried out on the optical member not included in the front elements: m (j) A length from the subject at the time of near photography to the front side main point of the whole system where the air conversion is carried out on the optical member not included in the whole system: n (k) A length from the top of the front elements on the optical axis to the imaging plane where the air conversion is carried out on the optical member not included in the front elements and the rear elements: $T_1$ (l) A length from the top of the rear elements on the optical axis to the imaging plane where the air conversion is carried out on the optical member not included in the rear elements: $T_2$ Here, the "length where the air conversion is carried out on the optical member not included in the front elements and the rear elements" denotes a "length" wherein when an optical member other than the front elements and the rear elements is disposed, taking into consideration the refractive index and thickness of the optical member, an optical length where a subject light passes through the optical member is converted into a length in air having the same optical length as the optical length where the subject light passes through the optical member.

For example, according to the example shown in FIG. 1, with respect to the length $T_1$ in item (k), between the top of the front elements 11 on the optical axis, which is the starting point of the length $T_1$ and the imaging plane 13, which is the terminal point of the length $T_1$, as the optical member other than the front elements 11 and the rear elements 12, there are disposed the cover glass 15 and the low-pass filter 16. Taking into consideration the refractive index and thickness of the cover glass 15 and the low-pass filter 16, an optical pass length where a subject light passes through the cover glass 15 and the low-pass filter 16 is converted into a length in air having the same optical path length as the optical path length where the subject light passes through the cover glass 15 and the low-pass filter 16 so that the length $T_1$ is determined.

That is, the length $T_1$ after the air conversion, wherein the cover glass 15 and the low-pass filter 16 are disposed, is expressed by the formula as set forth below.

$$T_1 = T_0 + \frac{n_1 - 1}{n_1} t_1 + \frac{n_2 - 1}{n_2} t_2$$

Where refractive index of the cover glass 15: $n_1$, thickness of the cover glass 15: $t_1$, refractive index of the low-pass filter 16: $n_2$, thickness of the low-pass filter 16: $t_2$, length $T_1$ before an arrangement of the cover glass 15 and the low-pass filter 16: length $T_0$ In the event that the optical member other than the front elements 11 and the rear elements 12 is disposed between the rear elements 12 and the imaging plane 13, it is possible to convert the length $T_2$ of the item (l) as well as the length $T_1$ of the item (k).

In a similar fashion to that, in the event that the optical member such as a crystal shutter, which has an effect on the optical path length, is disposed between the front elements 11 and the rear elements 12, the length L of the item (c), the focal length f of the item (h), and the length $T_1$ of the item (k) are converted. Further, in a similar fashion to that, in the event that the optical member such as a cover glass for covering lens and an optical filter, which has an effect on the optical path length, is disposed before the front elements 11, the lengths m and n of the items (i) and (j) are converted, respectively.

With respect to the item (i), the definition "the length where the air conversion is carried out on the optical member not included in the front elements" is given. The reason why the word "rear elements" is omitted is that the rear elements do not exist between the subject and the front side main point of the front elements.

In a similar fashion to that, with respect to the focal length f of the whole system and the front side main point of the whole system, when there exists an optical member between the front elements 11 and the rear elements 12 as well as the front elements 11 and the rear elements 12, it is necessary to consider the optical path length of the optical member. On the other hand, the optical members before the front elements and after the rear elements have nothing to do with this. Thus, the "whole system" is defined, as expressed in the item (h), as the "whole system comprising the front elements and the rear elements in zoom positions where the air conversion is carried out on the optical member interposed between the front elements and the rear elements".

Table 1 shows focal lengths of lens elements, main points and the like in the related art and the embodiments of the present invention.

TABLE 1

| | Focal lengths of lens elements and main points positions | | | |
|---|---|---|---|---|
| | Focal length F | Front side main point H1 | Main point intervals HH | Rear side main point H2 |
| Front elements | −12.42 | −1.09 | 0.75 | −5.44 |
| Rear elements | 10.26 | −1.10 | 1.62 | −4.07 |

Table 2 shows lens elements positions and focusing movement of the conventional zoom lens adopting the lens elements having the focal lengths of lens elements and main points positions shown in the table 1.

TABLE 2

| | Lens elements positions and focusing movement of the conventional zoom lens | | | | | | | | | |
|---|---|---|---|---|---|---|---|---|---|---|
| | Z1 | Z2 | z3 | z4 | z5 | z6 | z7 | z8 | z9 | z10 |
| Focal length(inf) | 5.70 | 6.20 | 6.78 | 7.45 | 8.24 | 9.18 | 10.33 | 11.78 | 13.65 | 16.13 |
| Magnification of rear elements | −0.459 | −0.499 | −0.546 | −0.600 | −0.664 | −0.739 | −0.832 | −0.949 | −1.099 | −1.299 |
| Front side main point of whole system | 10.12 | 10.02 | 9.90 | 9.77 | 9.61 | 9.43 | 9.24 | 9.09 | 8.14 | 7.71 |
| Front element rear side main point-rear element front side main point | 20.19 | 18.39 | 16.63 | 14.94 | 13.30 | 11.72 | 10.17 | 8.65 | 7.17 | 5.74 |
| Front elements lens position | 36.44 | 35.05 | 33.77 | 32.63 | 31.65 | 30.84 | 30.24 | 29.92 | 29.99 | 30.60 |
| Rear elements lens position (inf) | 15.48 | 15.90 | 16.38 | 16.93 | 17.58 | 18.36 | 19.31 | 20.51 | 22.05 | 24.10 |
| Rear elements focusing movement (inf → 600 mm) | 0.07 | 0.09 | 0.11 | 0.15 | 0.21 | 0.33 | 0.78 | focus non | Focus non | −0.67 |

In table 2, Z1 to Z10 denote zoom stages. Here, there will be described 10 stages of zoom lens of Z1 to Z10. However, the explanation is applicable to not only the zoom lens in which the focal length is varied stepwise, but also the zoom lens in which the focal length is continuously varied.

FIG. 2 is a view showing positions of the front elements and the rear elements at the respective zoom stages of the zoom lens of the characteristics shown in Table 2.

FIG. 2 shows the top position of the front elements on the optical axis in the respective zoom stage wherein the imaging plane is established as the base, which top position of the front elements will be referred to simply as the "front elements position", and the top position of the front elements on the optical axis, which top position of the rear elements will be referred to simply as the "rear elements position".

With respect to the rear elements position, FIG. 2 shows both the position in which an image of the subject at the infinite-point is formed on the imaging plane, and the position in which an image of the subject at the closest distance (for example, 600 mm) is formed on the imaging plane.

Here, there is provided such a design that at the stage of zooming an image taking apparatus is focused on the subject appearing at the infinite-point (inf), and when the subject appears at an point closer than the infinite-point (inf), the rear elements are moved to a position according to the distance of the subject.

As known in general, in the event that the rear elements are moved to focus an image taking apparatus on the subject appearing at the near distance, the focusing is performed in such a manner that the rear elements are moved in a direction that the lateral magnification of the rear elements approaches the direct magnification (−1). As seen from table 2, in case of the zoom stages Z1 to Z7, the lateral magnification of the rear elements is lower magnification (−0.459 to −0.832) than the direct magnification (−1), and when the rear elements are moved in a direction that the rear elements approaches the front elements, the lateral magnification of the rear elements approaches the direct magnification (−1). Accordingly, in case of the zoom stages Z1 to Z7, when it is intended that the image taking apparatus is focused on the subject appearing at the near distance, the rear elements are moved in a direction that the rear elements approaches the front elements. On the other hand, in case of the zoom stage Z10, the lateral magnification of the rear elements is higher magnification (−1.299) than the direct magnification (−1), and when the rear elements are moved in a direction that the rear elements recedes from the front elements, the lateral magnification of the rear elements approaches the direct magnification (−1). Accordingly, in case of the zoom stage Z10, when it is intended that the image taking apparatus is focused on the subject appearing at the near distance, the rear elements are moved in a direction that the rear elements recedes from the front elements.

With respect to the zoom stages Z8 and Z9, when the rear elements are disposed at a position that an image taking apparatus is focused on the infinite-point (this is referred to as "disposed at the position of the infinite-point"), the lateral magnification of the rear elements already approaches the direct magnification (−1). As seen from table 2, in case of the zoom stage Z8, when the rear elements are disposed at the position of the infinite-point, the lateral magnification of the rear elements is −0.949, and in case of the zoom stage Z9, when the rear elements are disposed at the position of the infinite-point, the lateral magnification of the rear elements is −1.099.

In case of the zoom stage Z8, when the rear elements are disposed at the position of the infinite-point, the lateral magnification of the rear elements is −0.949. This is little lower magnification than the direct magnification. Thus, when an image taking apparatus is focused on the subject appearing at the near distance, the rear elements are moved in a direction that the rear elements approaches the front elements so that the lateral magnification of the rear elements approaches the direct magnification. However, since the lateral magnification of the rear elements disposed at the position of the infinite-point is near the direct magnification from the first, the image taking apparatus is not focused on the subject appearing at the nearest distance 600 mm, even if the rear elements are moved in a direction that the rear elements approaches the front elements, so that the lateral magnification of the rear elements is up to the direct magnification. In other word, in the zoom stage Z8, it is impossible to focus the image taking apparatus on the subject appearing at the nearest distance 600 mm.

This is applicable also to the zoom stage Z9. In case of the zoom stage Z9, when the rear elements are disposed at the position of the infinite-point, the lateral magnification of the rear elements is −1.099. This is little higher magnification than the direct magnification. Thus, when an image taking apparatus is focused on the subject appearing at the near distance, the rear elements are moved in a direction that the rear elements recede from the front elements, different from the case of the zoom stage Z8 in the direction, so that the lateral magnification of the rear elements approaches the direct magnification. However, in a similar fashion to that of the zoom stage Z8, since the lateral magnification of the rear elements disposed at the position of the infinite-point is near the direct magnification from the first, the image taking apparatus cannot be focused on the subject appearing at the nearer distance, by the reason that when the rear elements are moved in a direction that the rear elements recedes from the front elements, the lateral magnification of the rear elements is immediately the direct magnification.

It is recognized that the retrofocus type of zoom lens is associated with the above-mentioned defects. As one of measures, the zoom stages are set up in such a manner that zooming is impossible for an area in which focusing is impossible (for example, according to the example shown in FIG. 2, the zoom stages are set up in such a manner that the process jumps from the zoom stage Z7 to Z10 so as not to use the zoom stages Z8 and Z9). As other measures, Japanese Patent Application Laid Open Gazette TokuKai. 2001-281522 (FIG. 1) proposes a matter that an area for zooming is divided into a plurality of areas, and different lens elements are used as focusing lens elements for each divided area.

In Japanese Patent Application Laid Open Gazette Toku-Kai. 2001-281522, there is disclosed such a recognition that in case of the retrofocus type of zoom lens, lens elements including the direct magnification exist, and the lens elements including the direct magnification cannot be used as the focus lens elements. And there is disclosed an example of two elements-retrofocus type of zoom lens in which as to some area of the zooming areas the rear elements are moved to focus, and as to another area the front elements are moved to focus.

Recently, in a camera of type in which photography is carried out on a silver halide film, and particularly in a digital camera in which an image is formed on a solid state imaging device to generate image data, it is requested for those cameras to use a zoom lens and to provide compactness and thinness. In order to satisfy those requests, it is preferable to adopt two elements of zoom lens, which is less in the number of lens elements, in stead of three elements of zoom lens, which is conventionally used. However, the two elements-retrofocus type of zoom lens is associated with the problems explained referring to table 2 and FIG. 2. Thus, the conventional two elements-retrofocus type of zoom lens is an unsatisfactory zoom lens in specification, for example, there are taken measures that zooming is prohibited for the area wherein focusing is impossible. If only the focusing is considered, the use of the front elements for focusing makes it possible to focus. However, in general, the front elements are large in size, and are heavy in weight. Thus focusing of the front elements by it's movement with great accuracy needs a large type of motor having a large driving force. This causes the mechanical parts to be large, so that this is contrary to the requests of the compactness and the thinness, and further brings about the cost up.

Further, as proposed in Japanese Patent Application Laid Open Gazette TokuKai. 2001-281522, when it is intended that an area for zooming is divided into a plurality of areas, and different lens elements are used as focusing lens elements for each divided area, in case of two elements of zoom lens, it is obliged that large and heavy front elements are also used for focusing. Thus this also needs a large type of motor having a large driving force, and in addition needs a changeover mechanism for focus lens elements. This is contrary to the requests of the compactness, the thinness and the low cost.

SUMMARY OF THE INVENTION

In view of the foregoing, it is an object of the present invention to provide a zoom lens in which two elements of zoom lens are adopted to satisfy requests of compactness and thinness of an image taking apparatus such as a camera, the zoom lens being capable of focusing by means of movement of only the rear elements in the zooming area in its entirety, and an image taking apparatus adopting the zoom lens as mentioned above.

To achieve the above-mentioned objects, the present invention provides a first zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein a track of the front elements by zooming is set up so that the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f_1^2}{m - f_1}, \quad (1)$$

where a length from a top of the front elements on an optical axis to a front side main point of the front elements: $Ha_1$, a main point interval of the front elements: $HH_1$, a length from a rear side main point of the front elements to a front side main point of the rear elements where an air conversion is carried out on an optical member not included in the front elements and the rear elements: L, a main point interval of the rear elements: $HH_2$, a focal length of the front elements: $f_1$, a focal length of the rear elements: $f_2$, a length from the object at the time of near photography to the front side main point of the front elements where the air conversion is carried out on the optical member not included in the front elements: m, and a length from the top of the front elements on the optical axis to the imaging plane where the air conversion is carried out on the optical member not included in the front elements and the rear elements: $T_1$.

In case of design of the zoom lens, hitherto, it is a matter of common knowledge that the tracks of tracks of the front elements and the rear elements by zooming are set up in such a manner that an image taking apparatus is focused on the infinite-point, and it is designed that the focus lens elements are movable between a position that the image taking apparatus is focused on the infinite-point on the track and a position that the image taking apparatus is focused on the closest distance. In case of two elements-retrofocus type of zoom lens, it is believed on a common sense that focusing is difficult in some position of zooming.

The inventors of the present application find that in a zoom lens of two elements comprising a front elements lens having a negative refractivity and a rear elements lens having a positive refractivity in sequence from an object side, that is, a so-called two elements-retrofocus type of zoom lens, focusing of tracks of the front elements and the rear elements by zooming on the closest distance makes it possible to focus on the whole subject distance from the closest distance to the infinite-point through movement of only the rear elements in the whole area of zooming, and thus achieves the present invention.

As in the conventional case, in the event that tracks of the front elements and the rear elements in zooming are set up so that an image taking apparatus is focused on the infinite-point, with respect to the front elements, the track in zooming is set up so as to satisfy formula (2) as set forth below, in which the last item of the right side in the formula (1) is deleted, and a sign of inequality is replaced by a sign of equality.

$$T_1 = Ha_1 + HH_1 + L + HH_2 + \frac{f_2(f_1 - L)}{f_1 + f_2 - L_1} \quad (2)$$

According to the first zoom lens of the present invention, the front elements are disposed at a position approaching the subject side by the item, $f_1^2/(m-f_1)$, taking into consideration at least subject distance m at the time of the closer photography more than the formula (2). More in detail, in this case, the track of the front elements in zooming is set up so as to satisfy formula (3) as set forth below, in which a sign of inequality in the formula (1) is replaced by a sign of equality.

$$T_1 = Ha_1 + HH_1 + L + HH_2 + \frac{f_2(f_1 - L)}{f_1 + f_2 - L} + \frac{f_1^2}{m - f_1} \quad (3)$$

Setting up of the track of the front elements to satisfy the formula (3) makes it possible to set up the track so that the rear elements always focuses on the subject of the closest distance. Thus, even if any position of the zooming is concerned, it is possible to focus on any subject distance from the closest distance to the infinite-point by simply moving only the rear elements.

When the track of the front elements in zooming is set up so as to satisfy formula (4) set forth below, in which a sign of equality of the formula (3) is replaced by a sign of inequality, a movement of only the rear elements makes it possible to focus on the closer distance than the nominal closest distance m.

$$T_1 > Ha_1 + HH_1 + L + HH_2 + \frac{f_2(f_1 - L)}{f_1 + f_2 - L} + \frac{f_1^2}{m - f_1} \quad (4)$$

In theory, the formula (3) is sufficient. However, actually, there is a need to leave a margin for focusing and a margin for compensating for variation of a focusing position due to temperature and humidity. Thus, it is preferable to determine the track of the front elements in zooming so as to satisfy the formula (4).

In the first zoom lens according to the present invention as mentioned above, it is preferable that a track of the front elements by zooming is set up in such a manner that the front elements are disposed at a position that formulas set forth below are satisfied.

$$T_1 \geq Ha_1 + HH_1 + L + HH_2 + \frac{f_2(f_1 - L)}{f_1 + f_2 - L} + \frac{f_1^2}{m - f_1} \quad (1)$$

$$T_1 \leq Ha_1 + HH_1 + L + HH_2 + \frac{f_2(f_1 - L)}{f_1 + f_2 - L} - f_1 \quad (5)$$

In the event that the front elements are disposed at the subject side exceeding the upper limit shown in the formula (5), the closest distance of the subject to be focused is inside more than the tip of the front elements. Further, the front elements are located at unnecessarily shifted places to the subject side. These are not preferable in view of compactness and thinning of an image taking apparatus adopting the zoom lens.

To achieve the above-mentioned objects, the present invention provides a second zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein a track of the front elements by zooming is set up in such a manner that of zooming areas, at a predetermined area including a predetermined direct magnification neighbor area wherein lateral magnification of the rear elements is direct magnification neighbor, the front elements are disposed at a position that formula set forth below is satisfied, $$T_1 \geq Ha_1 + HH_1 + L + HH_2 + \frac{f_2(f_1 - L)}{f_1 + f_2 - L} + \frac{f_1^2}{m - f_1} \quad (1)$$

and of the zooming areas, at a predetermined zooming point or area excepting the predetermined area, the front elements are disposed at a position that formulas set forth below are satisfied, $$T_1 \geq Ha_1 + HH_1 + L + HH_2 + \frac{f_2(f_1 - L)}{f_1 + f_2 - L_1} \quad (6)$$

$$T_1 < Ha_1 + HH_1 + L + HH_2 + \frac{f_2(f_1 - L)}{f_1 + f_2 - L} + \frac{f_1^2}{m - f_1} \quad (7)$$

where a length from the top of the front elements on the optical axis to the front side main point of the front elements: $Ha_1$, a main point interval of the front elements: $HH_1$, a length from the rear side main point of the front elements to the front side main point of the rear elements where the air conversion is carried out on the optical member not included in the front elements and the rear elements: L, a main point interval of the rear elements: $HH_2$, a focal length of the front elements: $f_1$, a focal length of the rear elements: $f_2$, a length from the subject at the time of near photography to the front side main point of the front elements where the air conversion is carried out on the optical member not included in the front elements: m, and a length from the top of the front elements on the optical axis to the imaging plane where the air conversion is carried out on the optical member not included in the front elements and the rear elements: $T_1$.

In case of the first zooming lens, the track of the front elements in zooming is set up so as to satisfy the formula (1) over the whole areas of the zooming. In this case, the track of the front elements is expressed by only the formula (1) and thus it is possible to simply determine the track of a position of the front elements. On the other hand, as explained referring to Table 2 and FIG. 2, even if the track is set up so as to focus an image taking apparatus on the subject of the infinite-point, an area, in which the rear elements cannot focus an image taking apparatus onto the closest distance, is a part but not the whole area in zooming. That is, there is no need that the track of the front elements is set up so as to always satisfy the formula (1), and it is effective that only a direct magnification neighbor area (zoom stages Z8 and Z9 in case of Table 2 and FIG. 2), wherein a lateral magnification of the rear elements disposed at the position of the infinite-point-is near the direct magnification, satisfies the formula (1), and with respect to an area other than the direct magnification neighbor area, it is acceptable that the track of the front elements is set up at a track (the formula (2)) for focusing on the subject of the infinite-point, or at an intermediate between the track (the formula (2)) and a track (the formula (3)) for focusing on the subject of the closest distance.

According to the second zoom lens of the present invention, the above-mentioned point is taken into consideration. A track of the front elements by the zooming is determined in such a manner that in a predetermined area including the direct magnification neighbor area, in a similar fashion to that of the first zoom lens, the front elements are disposed at the position satisfying the formula (1), and in the zooming point or areas other than the predetermined area including the direct magnification neighbor area, the front elements are disposed at the position simultaneously satisfying both the formula (6) and the formula (7). Also in this case, in the whole area in zooming, it is possible to focus on any subject distance from the infinite-point to the closest distance by moving only the rear elements.

In the second zoom lens according to the present invention as mentioned above, it is preferable that a track of the front elements by zooming is set up in such a manner that at the predetermined area, the front elements are disposed at a position that formulas set forth below are satisfied.

$$T_1 \geq Ha_1 + HH_1 + L + HH_2 + \frac{f_2(f_1 - L)}{f_1 + f_2 - L} + \frac{f_1^2}{m - f_1} \quad (1)$$

$$T_1 \leq Ha_1 + HH_1 + L + HH_2 + \frac{f_2(f_1 - L)}{f_1 + f_2 - L} - f_1 \quad (5)$$

Also in the second zoom lens of the present invention, in the area satisfying the formula (1) it is similar to that of the first zoom lens, it is preferable that the track of the front elements is set up not so as to exceed the upper limit shown in the formula (5).

To achieve the above-mentioned objects, the present invention provides a third zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein tracks of the front elements and the rear elements by zooming are set up so that the front elements are disposed at a position that formula set forth below is satisfied, $$T_1 \geq Ha_1 + HH_1 + L + HH_2 + \frac{f_2(f_1 - L)}{f_1 + f_2 - L} + \frac{f^2}{n - f} \quad (8)$$

and the rear elements are disposed at a position that formula set forth below is satisfied, $$T_2 \geq Ha_2 + HH_2 + \frac{f_2(f_1 - L)}{f_1 + f_2 - L} + \frac{f^2}{n - f} \quad (9)$$

where a length from the top of the front elements on the optical axis to the front side main point of the front elements: $Ha_1$, a main point interval of the front elements: $HH_1$, a length from the rear side main point of the front elements to the front side main point of the rear elements where the air conversion is carried out on the optical member not included in the front elements and the rear elements: L, a main point interval of the rear elements: $HH_2$, a length from the top of the rear elements on the optical axis to the front side main point of the rear elements: $Ha_2$, a focal length of the front elements: $f_1$, a focal length of the rear elements: $f_2$, a focal length of the whole system comprising the front elements and the rear elements in zoom positions where the air conversion is carried out on the optical member interposed between the front elements and the rear elements: f, a length from the subject at the time of near photography to the front side main point of the whole system where the air conversion is carried out on the optical member not included in the whole system: n a length from the top of the front elements on the optical axis to the imaging plane where the air conversion is carried out on the optical member not included in the front elements and the rear elements: $T_1$, and, a length from the top of the rear elements on the optical axis to the imaging plane where the air conversion is carried out on the optical member not included in the rear elements: $T_2$.

In case of the first zoom lens and the second zoom lens, to achieve the objects of the present invention, only the track of the front elements is noticed. However, notice of both the front elements and the rear elements also makes it possible to focus on the whole subject information from the closest distance to the infinite-point through a movement of only the rear elements in the whole area in zooming.

More in detail, according to the third zoom lens of the present invention, the track of the front elements in zooming is set up so as to satisfy formula (10) as set forth below, in which a sign of inequality in at least the formula (8) is replaced by a sign of equality.

$$T_1 = Ha_1 + HH_1 + L + HH_2 + \frac{f_2(f_1 - L)}{f_1 + f_2 - L} + \frac{f^2}{n - f} \quad (10)$$

and the track of the rear elements in zooming is set up so as to satisfy formula (11) as set forth below, in which a sign of inequality in at least the formula (9) is replaced by a sign of equality.

$$T_2 = Ha_2 + HH_2 + \frac{f_2(f_1 - L)}{f_1 + f_2 - L} + \frac{f^2}{n - f} \quad (11)$$

Thus, even if any position of the zooming is concerned, it is possible to focus on any subject distance from the closest distance to the infinite-point by simply moving only the rear elements.

When the tracks of the front elements and the rear elements in zooming are set up so as to satisfy formulas (12) and (13) set forth below, in which a sign of equality of the formulas (10) and (11) is replaced by a sign of inequality, a movement of only the rear elements makes it possible to focus on the closer distance than the nominal closest distance n.

$$T_1 > Ha_1 + HH_1 + L + HH_2 + \frac{f_2(f_1 - L)}{f_1 + f_2 - L} + \frac{f^2}{n - f} \quad (12)$$

$$T_2 > Ha_2 + HH_2 + \frac{f_2(f_1 - L)}{f_1 + f_2 - L} + \frac{f^2}{n - f} \quad (13)$$

In theory, the formula (3) is sufficient. However, actually, there is a need to leave a margin for focusing and a margin for compensating for variation of a focusing position due to temperature and humidity. Thus, it is preferable to determine the track of the front elements in zooming so as to satisfy the formulas (12) and (13).

In the third zoom lens according to the present invention as mentioned above, it is preferable that tracks of the front elements and the rear elements by zooming are set up in such a manner that the front elements are disposed at a position that formulas set forth below are satisfied, $$T_1 \geq Ha_1 + HH_1 + L + HH_2 + \frac{f_2(f_1 - L)}{f_1 + f_2 - L} + \frac{f^2}{n - f} \quad (8)$$

$$T_1 \leq Ha_1 + HH_1 + L + HH_2 + \frac{f_2(f_1 - L)}{f_1 + f_2 - L} - f \quad (14)$$

and the rear elements are disposed at a position that formulas set forth below are satisfied.

$$T_2 \geq Ha_2 + HH_2 + \frac{f_2(f_1 - L)}{f_1 + f_2 - L} + \frac{f^2}{n - f} \quad (9)$$

$$T_2 \leq Ha_2 + HH_2 + \frac{f_2(f_1 - L)}{f_1 + f_2 - L} - f \quad (15)$$

In the event that the front elements and the rear elements are disposed at the subject side exceeding the upper limit shown in the formulas (14) and (15), the closest distance of the subject to be focused is inside more than the tip of the front elements. Further, the front elements are located at unnecessarily'shifted places to the subject side. These are not preferable in view of compactness and thinning of an image taking apparatus adopting the zoom lens.

To achieve the above-mentioned objects, the present invention provides a fourth zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein tracks of the front elements and the rear elements by zooming are set up in such a manner that of zooming areas, at a predetermined area including a predetermined direct magnification neighbor area wherein lateral magnification of the rear elements is direct magnification neighbor, the front elements are disposed at a position that formula set forth below is satisfied, $$T_1 \geq Ha_1 + HH_1 + L + HH_2 + \frac{f_2(f_1 - L)}{f_1 + f_2 - L} + \frac{f^2}{n - f} \quad (8)$$

and the rear elements are disposed at a position that formula set forth below is satisfied, $$T_2 \geq Ha_2 + HH_2 + \frac{f_2(f_1 - L)}{f_1 + f_2 - L} + \frac{f^2}{n - f} \quad (9)$$

and of the zooming areas, at a predetermined zooming point or area excepting the predetermined area, the front elements are disposed at a position that formulas set forth below are satisfied, $$T_1 \geq Ha_1 + HH_1 + L + HH_2 + \frac{f_2(f_1 - L)}{f_1 + f_2 - L_1} \quad (16)$$

-continued $$T_1 < Ha_1 + HH_1 + L + HH_2 + \frac{f_2(f_1 - L)}{f_1 + f_2 - L} + \frac{f^2}{n - f} \quad (17)$$

and the rear elements are disposed at a position that formulas set forth below are satisfied, $$T_2 \geq Ha_2 + HH_2 + \frac{f_2(f_1 - L)}{f_1 + f_2 - L} \quad (18)$$

$$T_2 < Ha_2 + HH_2 + \frac{f_2(f_1 - L)}{f_1 + f_2 - L} + \frac{f^2}{n - f} \quad (19)$$

where a length from the top of the front elements on the optical axis to the front side main point of the front elements: $Ha_1$,
a main point interval of the front elements: $HH_1$,
a length from the rear side main point of the front elements to the front side main point of the rear elements where the air conversion is carried out on the optical member not included in the front elements and the rear elements: L,
a main point interval of the rear elements: $HH_2$,
a length from the top of the rear elements on the optical axis to the front side main point of the rear elements: $Ha_2$,
a focal length of the front elements: $f_1$,
a focal length of the rear elements: $f_2$,
a focal length of the whole system comprising the front elements and the rear elements in zoom positions where the air conversion is carried out on the optical member interposed between the front elements and the rear elements: f,
a length from the subject at the time of near photography to the front side main point of the whole system where the air conversion is carried out on the optical member not included in the whole system: n
a length from the top of the front elements on the optical axis to the imaging plane where the air conversion is carried out on the optical member not included in the front elements and the rear elements: $T_1$, and,
a length from the top of the rear elements on the optical axis to the imaging plane where the air conversion is carried out on the optical member not included in the rear elements: $T_2$.

In case of the third zooming lens, the tracks of the front elements and the rear elements in zooming are set up so as to satisfy the formulas (8) and (9) over the whole areas of the zooming. In this case, the tracks of the front elements and the rear elements are expressed by only the formulas (8) and (9) and thus it is possible to simply determine the tracks of positions of the front elements and the rear elements. On the other hand, as explained referring to Table 2 and FIG. 2, even if the track is set up so as to focus an image taking apparatus on the subject of the infinite-point, an area, in which the rear elements cannot focus an image taking apparatus onto the closest distance, is a part but not the whole area in zooming. That is, there is no need that the tracks of the front elements and the rear elements are set up so as to always satisfy the formulas (8) and (9), and it is effective that only a direct magnification neighbor area (zoom stages Z8 and Z9 in case of Table 2 and FIG. 2), wherein a lateral magnification of the rear elements disposed at the position of the infinite-point is near the direct magnification, satisfies the formulas (8) and (9), and with respect to an area other than the direct magnification neighbor area, it is acceptable that the tracks of the front elements and the rear elements are set up at a track for focusing on the subject of the infinite-point, or at an intermediate between the track and a track for focusing on the subject of the closest distance.

According to the fourth zoom lens of the present invention; the above-mentioned point is taken into consideration. Tracks of the front elements and the rear elements by the zooming are determined in such a manner that in a predetermined area including the direct magnification neighbor area, in a similar fashion to that of the third zoom lens, the front elements are disposed at the position satisfying the formulas (8) and (9), and in the zooming point or areas other than the predetermined area including the direct magnification neighbor area, the front elements are disposed at the position simultaneously satisfying both the formula (16) and the formula (17), and the rear elements are disposed at the position simultaneously satisfying both the formula (18) and the formula (19). Also in this case, in the whole area in zooming, it is possible to focus on any subject distance from the infinite-point to the closest distance by moving only the rear elements.

In the fourth zoom lens according to the present invention as mentioned above, it is preferable that tracks of the front elements and the rear elements by zooming are set up in such a manner that at the predetermined area, the front elements are disposed at a position that formulas set forth below are satisfied, $$T_1 \geq Ha_1 + HH_1 + L + HH_2 + \frac{f_2(f_1 - L)}{f_1 + f_2 - L} + \frac{f^2}{n - f} \quad (8)$$

$$T_1 \leq Ha_1 + HH_1 + L + HH_2 + \frac{f_2(f_1 - L)}{f_1 + f_2 - L} - f \quad (14)$$

and the rear elements are disposed at a position that formulas set forth below are satisfied.

$$T_2 \geq Ha_2 + HH_2 + \frac{f_2(f_1 - L)}{f_1 + f_2 - L} + \frac{f^2}{n - f} \quad (9)$$

$$T_2 \leq Ha_2 + HH_2 + \frac{f_2(f_1 - L)}{f_1 + f_2 - L} - f \quad (15)$$

Also in the fourth zoom lens of the present invention, in the area satisfying the formulas (8) and (9) it is similar to that of the first zoom lens, it is preferable that the track of the front elements is set up not so as to exceed the upper limit shown in the formulas (14) and (15).

In any of the first to fourth zoom lens according to the present invention as mentioned above, it is preferable that a movement of only the rear elements, of the front elements and the rear elements, performs focusing.

To achieve the above-mentioned objects, the present invention provides a first image taking apparatus comprising an imaging device and a zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein a track of the front elements by zooming is set up so that the front elements are disposed at a position that formula set forth below is satisfied, $$T_1 \geq Ha_1 + HH_1 + L + HH_2 + \frac{f_2(f_1 - L)}{f_1 + f_2 - L} + \frac{f_1^2}{m - f_1} \quad (1)$$

Where a length from the top of the front elements on the optical axis to the front side main point of the front elements: $Ha_1$, a main point interval of the front elements: $HH_1$, a length from the rear side main point of the front elements to the front side main point of the rear elements where the air conversion is carried out on the optical member not included in the front elements and the rear elements: L, a main point interval of the rear elements: $HH_2$, a focal length of the front elements: $f_1$, a focal length of the rear elements: $f_2$, a length from the subject at the time of near photography to the front side main point of the front elements where the air conversion is carried out on the optical member not included in the front elements: m, and a length from the top of the front elements on the optical axis to the imaging plane where the air conversion is carried out on the optical member not included in the front elements and the rear elements: $T_1$.

To achieve the above-mentioned objects, the present invention provides a second image taking apparatus comprising an imaging device and a zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein a track of the front elements by zooming is set up in such a manner that of zooming areas, at a predetermined area including a predetermined direct magnification neighbor area wherein lateral magnification of the rear elements is direct magnification neighbor, the front elements are disposed at a position that formula set forth below is satisfied, $$T_1 \geq Ha_1 + HH_1 + L + HH_2 + \frac{f_2(f_1 - L)}{f_1 + f_2 - L} + \frac{f_1^2}{m - f_1} \quad (1)$$

and of the zooming areas, at a predetermined zooming point or area excepting the predetermined area, the front elements are disposed at a position that formulas set forth below are satisfied, $$T_1 \geq Ha_1 + HH_1 + L + HH_2 + \frac{f_2(f_1 - L)}{f_1 + f_2 - L_1} \quad (6)$$

$$T_1 < Ha_1 + HH_1 + L + HH_2 + \frac{f_2(f_1 - L)}{f_1 + f_2 - L} + \frac{f_1^2}{m - f_1} \quad (7)$$

Where a length from the top of the front elements on the optical axis to the front side main point of the front elements: $Ha_1$, a main point interval of the front elements: $HH_1$, a length from the rear side main point of the front elements to the front side main point of the rear elements where the air conversion is carried out on the optical member not included in the front elements and the rear elements: L, a main point interval of the rear elements: $HH_2$, a focal length of the front elements: $f_1$, a focal length of the rear elements: $f_2$, a length from the subject at the time of near photography to the front side main point of the front elements where the air conversion is carried out on the optical member not included in the front elements: m, and a length from the top of the front elements on the optical axis to the imaging plane where the air conversion is carried out on the optical member not included in the front elements and the rear elements: $T_1$.

To achieve the above-mentioned objects, the present invention provides a third image taking apparatus comprising an imaging device and a zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein tracks of the front elements and the rear elements by zooming are set up so that the front elements are disposed at a position that formula set forth below is satisfied, $$T_1 \geq Ha_1 + HH_1 + L + HH_2 + \frac{f_2(f_1 - L)}{f_1 + f_2 - L} + \frac{f^2}{n - f} \quad (8)$$

and the rear elements are disposed at a position that formula set forth below is satisfied, $$T_2 \geq Ha_2 + HH_2 + \frac{f_2(f_1 - L)}{f_1 + f_2 - L} + \frac{f^2}{n - f} \quad (9)$$

where a length from the top of the front elements on the optical axis to the front side main point of the front elements: $Ha_1$, a main point interval of the front elements: $HH_1$, a length from the rear side main point of the front elements to the front side main point of the rear elements where the air conversion is carried out on the optical member not included in the front elements and the rear elements: L, a main point interval of the rear elements: $HH_2$, a length from the top of the rear elements on the optical axis to the front side main point of the rear elements: $Ha_2$, a focal length of the front elements: $f_1$, a focal length of the rear elements: $f_2$, a focal length of the whole system comprising the front elements and the rear elements in zoom positions where the air conversion is carried out on the optical member interposed between the front elements and the rear elements: f, a length from the subject at the time of near photography to the front side main point of the whole system where the air conversion is carried out on the optical member not included in the whole system: n a length from the top of the front elements on the optical axis to the imaging plane where the air conversion is carried out on the optical member not included in the front elements and the rear elements: $T_1$, and, a length from the top of the rear elements on the optical axis to the imaging plane where the air conversion is carried out on the optical member not included in the rear elements: $T_2$.

To achieve the above-mentioned objects, the present invention provides a fourth image taking apparatus comprising an imaging device and a zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein tracks of the front elements and the rear elements by zooming are set up in such a manner that of zooming areas, at a predetermined area including a predetermined direct magnification neighbor area wherein lateral magnification of the rear elements is direct magnification neighbor, the front elements are disposed at a position that formula set forth below is satisfied, $$T_1 \geq Ha_1 + HH_1 + L + HH_2 + \frac{f_2(f_1 - L)}{f_1 + f_2 - L} + \frac{f^2}{n - f} \quad (8)$$

and the rear elements are disposed at a position that formula set forth below is satisfied, $$T_2 \geq Ha_2 + HH_2 + \frac{f_2(f_1 - L)}{f_1 + f_2 - L} + \frac{f^2}{n - f} \quad (9)$$

and of the zooming areas, at a predetermined zooming point or area excepting the predetermined area, the front elements are disposed at a position that formulas set forth below are satisfied, $$T_1 \geq Ha_1 + HH_1 + L + HH_2 + \frac{f_2(f_1 - L)}{f_1 + f_2 - L_1} \quad (16)$$

$$T_1 < Ha_1 + HH_1 + L + HH_2 + \frac{f_2(f_1 - L)}{f_1 + f_2 - L} + \frac{f^2}{n - f} \quad (17)$$

and the rear elements are disposed at a position that formulas set forth below are satisfied, $$T_2 \geq Ha_2 + HH_2 + \frac{f_2(f_1 - L)}{f_1 + f_2 - L} \quad (18)$$

$$T_2 < Ha_2 + HH_2 + \frac{f_2(f_1 - L)}{f_1 + f_2 - L} + \frac{f^2}{n - f} \quad (19)$$

where a length from the top of the front elements on the optical axis to the front side main point of the front elements: $Ha_1$, a main point interval of the front elements: $HH_1$, a length from the rear side main point of the front elements to the front side main point of the rear elements where the air conversion is carried out on the optical member not included in the front elements and the rear elements: L, a main point interval of the rear elements: $HH_2$, a length from the top of the rear elements on the optical axis to the front side main point of the rear elements: $Ha_2$, a focal length of the front elements: $f_1$, a focal length of the rear elements: $f_2$, a focal length of the whole system comprising the front elements and the rear elements in zoom positions where the air conversion is carried out on the optical member interposed between the front elements and the rear elements: f, a length from the subject at the time of near photography to the front side main point of the whole system where the air conversion is carried out on the optical member not included in the whole system: n a length from the top of the front elements on the optical axis to the imaging plane where the air conversion is carried out on the optical member not included in the front elements and the rear elements: $T_1$, and, a length from the top of the rear elements on the optical axis to the imaging plane where the air conversion is carried out on the optical member not included in the rear elements: $T_2$.

DETAILED DESCRIPTION OF PREFERRED EMBODIMENTS

Embodiments of the present invention will be described with reference to the accompanying drawings.

Figure 3:
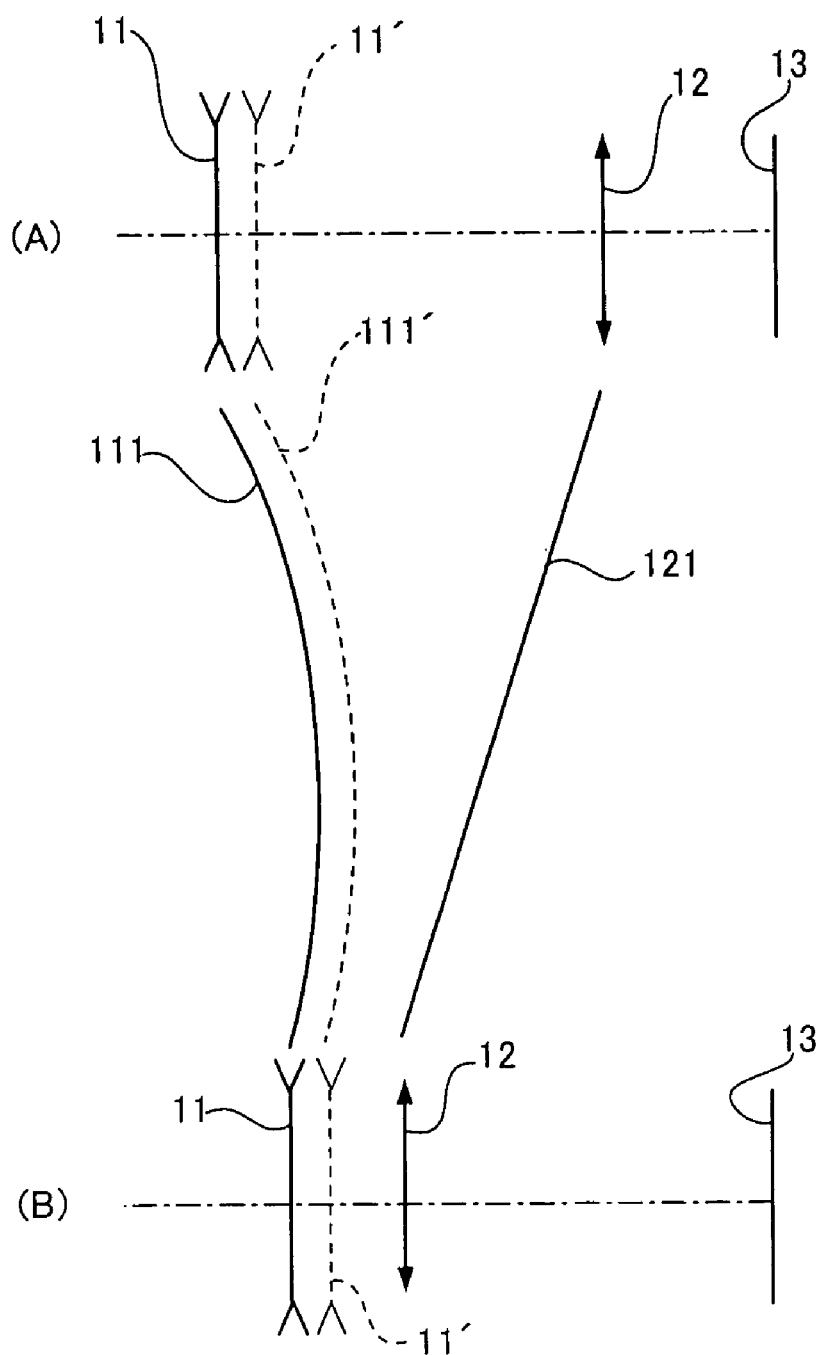
FIG. 3 is a view showing a zoom lens according to the first embodiment of the present invention.

FIG. 3 is a view showing a zoom lens according to the first embodiment of the present invention. Parts (A) and (B) of FIG. 3 show positions of lens elements at the wide-angle edge and the telephoto-edge, respectively.

The zoom lens comprises front elements 11 having a negative power and rear elements 12 having a positive power. Zooming operation causes the front elements 11 to move along a track 111 and causes the rear elements 12 to move along a track 121. In any zoom stages, the rear elements 12 move for focusing in accordance with the subject distance so that the subject is formed on an imaging plane 13 in the focusing state. In case of a digital camera, a solid state imaging device is disposed at the position which is coincident with the imaging plane 13. On the other hand, in case of a camera wherein photography is carried out on a photographic film, the photographic film is disposed at the imaging plane 13.

Front elements 11' and a track 111' of the front elements 11', which are shown with a broken line, denote the front elements position and the track position, respectively, which are set up in such a manner that the conventional concept that when the zooming is carried out, an image taking apparatus is focused on the infinite-point, that is, the above-mentioned formula (2), as set forth below, is satisfied.

$$T_1 = Ha_1 + HH_1 + L + HH_2 + \frac{f_2(f_1 - L)}{f_1 + f_2 - L_1} \quad (2)$$

Figure 2:
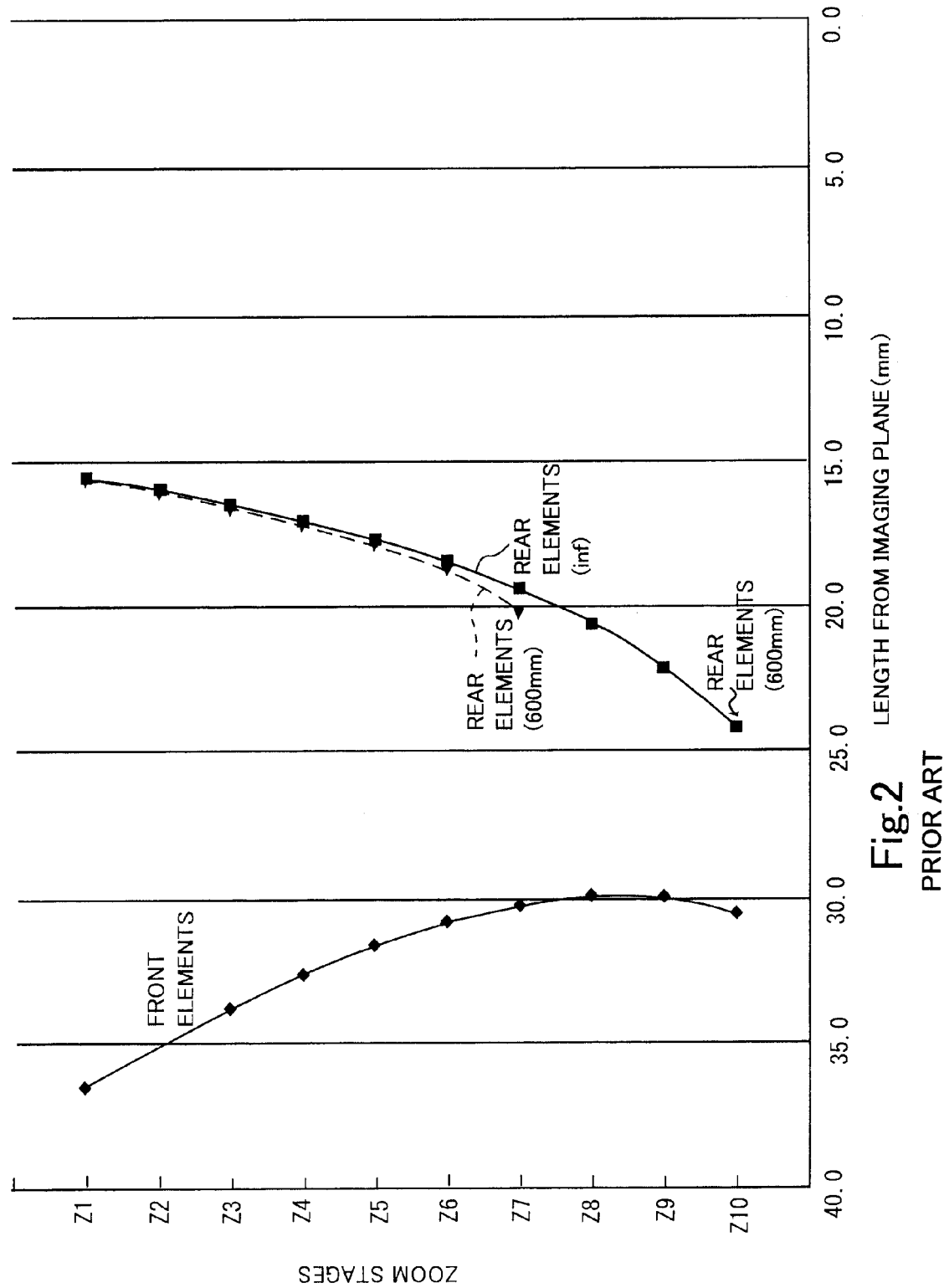
FIG. 2 is a view showing positions of the front elements and the rear elements at the respective zoom stages of the zoom lens of the characteristics shown in Table 2.

In this case, as explained referring to Table 2 and FIG. 2, there appears an area wherein focusing is impossible on a part of the zooming area.

To the contrary, front elements 11 and a track 111 of the front elements 11 in the present embodiment, which are shown with a solid line in FIG. 3, denote the front elements position and the track position, respectively, which are set up in such a manner that the above-mentioned formula (1), as set forth below, is satisfied.

$$T_1 \geq Ha_1 + HH_1 + L + HH_2 + \frac{f_2(f_1 - L)}{f_1 + f_2 - L} + \frac{f_1^2}{m - f_1} \quad (1)$$

In this case, as will be described more in detail hereinafter, it is possible for anyone of the zoom stages to focus on anyone of the subject distances between the closest distance to the infinite-point. As described above, a sign of inequality of the formula (1) is for compensating for the margin or the error, and logically the front elements position and the track position are set up in such a manner that the above-mentioned formula (3), as set forth below, in which a sign of inequality of the formula (1) is replaced by a sign of equality, is satisfied.

$$T_1 = Ha_1 + HH_1 + L + HH_2 + \frac{f_2(f_1 - L)}{f_1 + f_2 - L} + \frac{f_1^2}{m - f_1} \quad (3)$$

Table 3 shows lens elements positions and focusing movement of the zoom lens adopting the lens elements having the focal lengths of lens elements and main points positions shown in the table 1, according to the first embodiment (embodiment 1) of the present invention.

Figure 4:
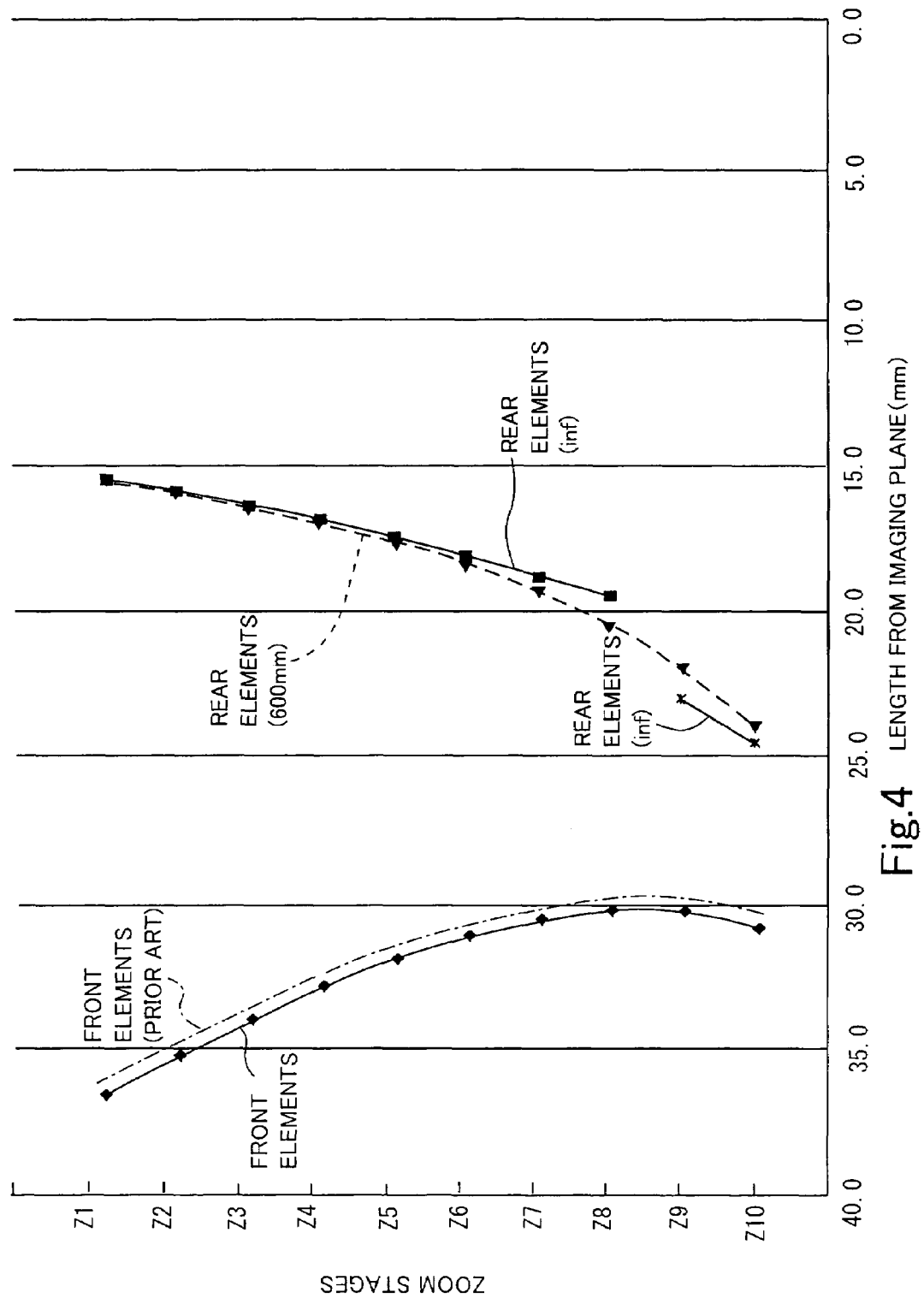
FIG. 4 is a view showing positions of the front elements and the rear elements at the respective zoom stages shown in Table 3 of the zoom lens of the characteristics shown in Table 1.
Figure 5:
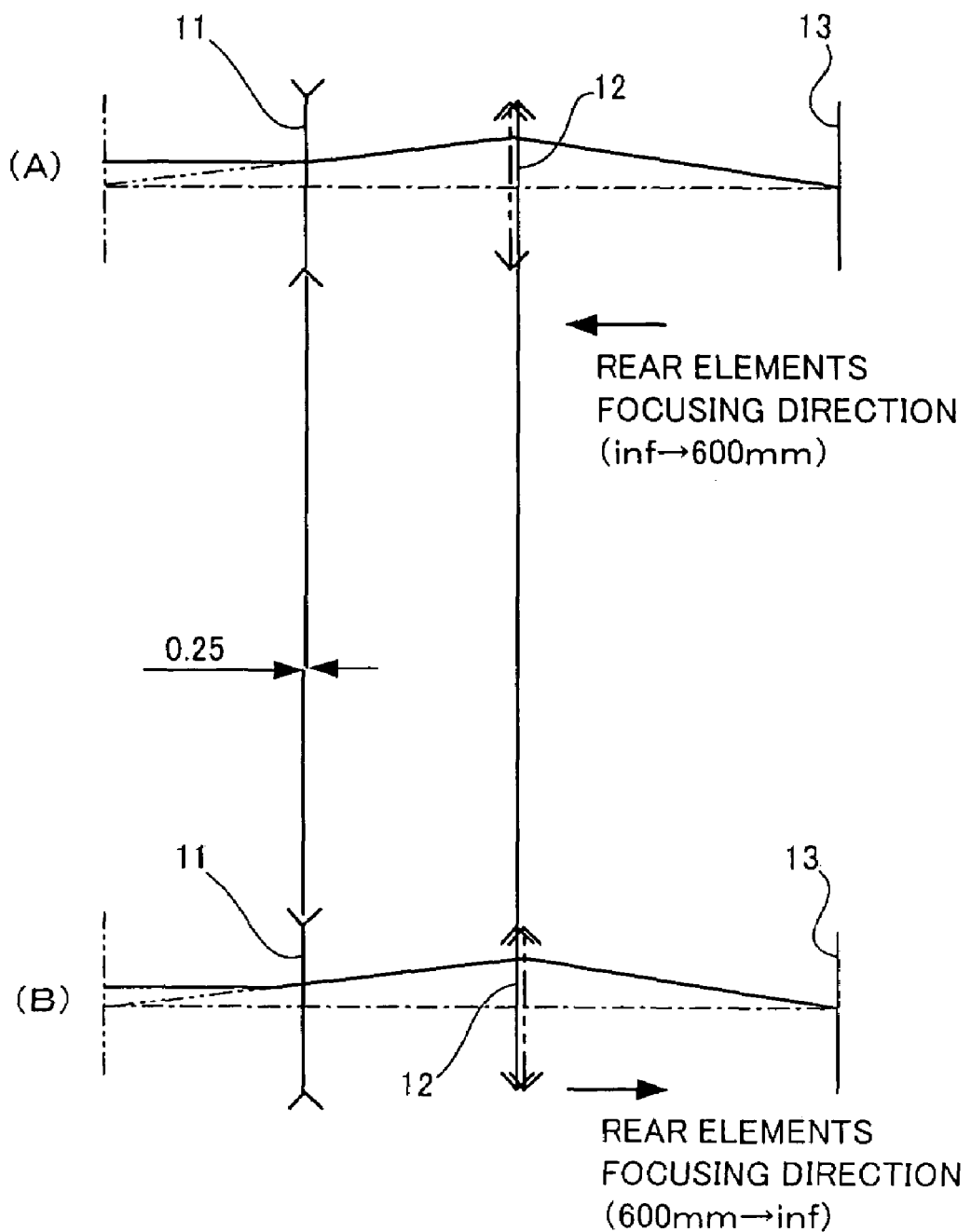
FIG. 5 is a view showing a comparison of zoom stage Z6 of Table 2 (FIG. 2) with zoom stage Z6 of Table 3 (FIG. 4).
Figure 6:
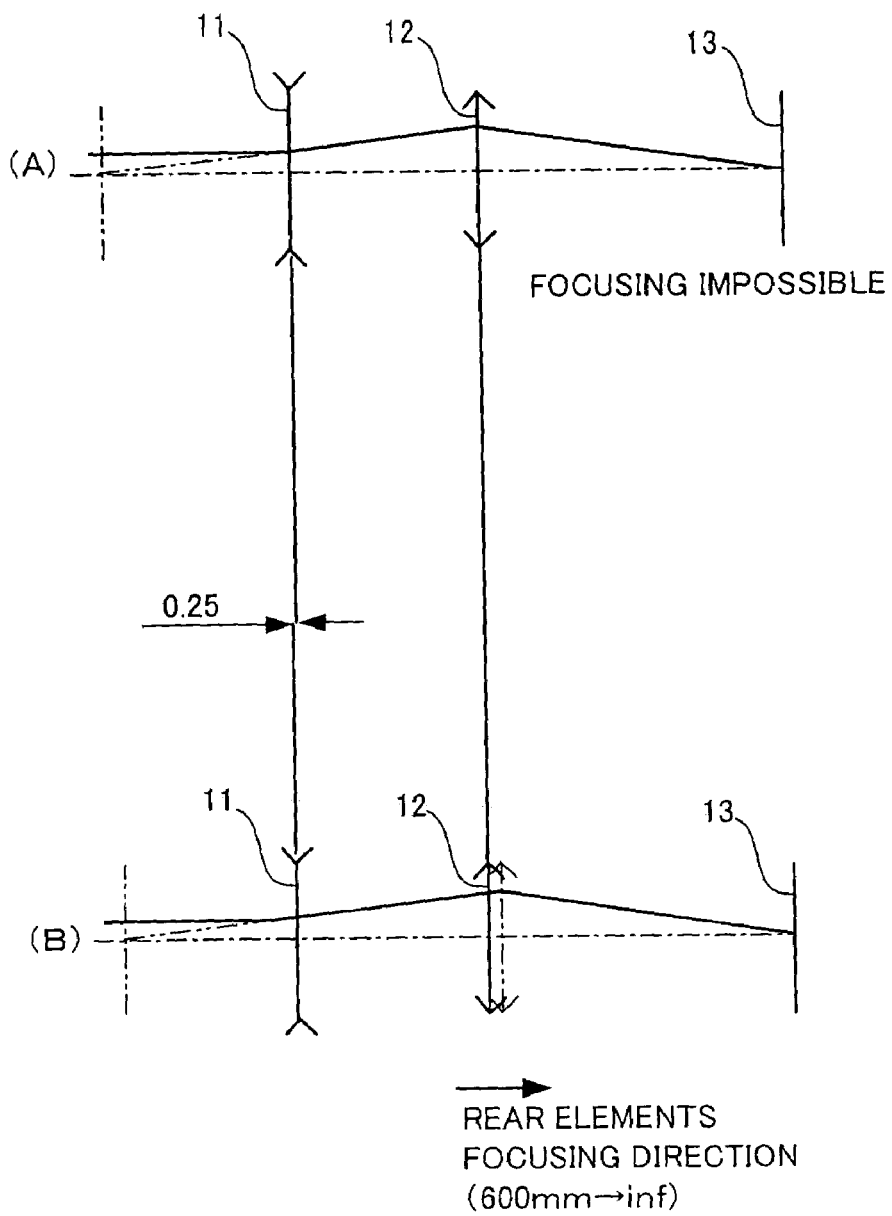
FIG. 6 is a view showing a comparison of zoom stage Z8 of Table 2 (FIG. 2) with zoom stage Z8 of Table 3 (FIG. 4).
Figure 7:
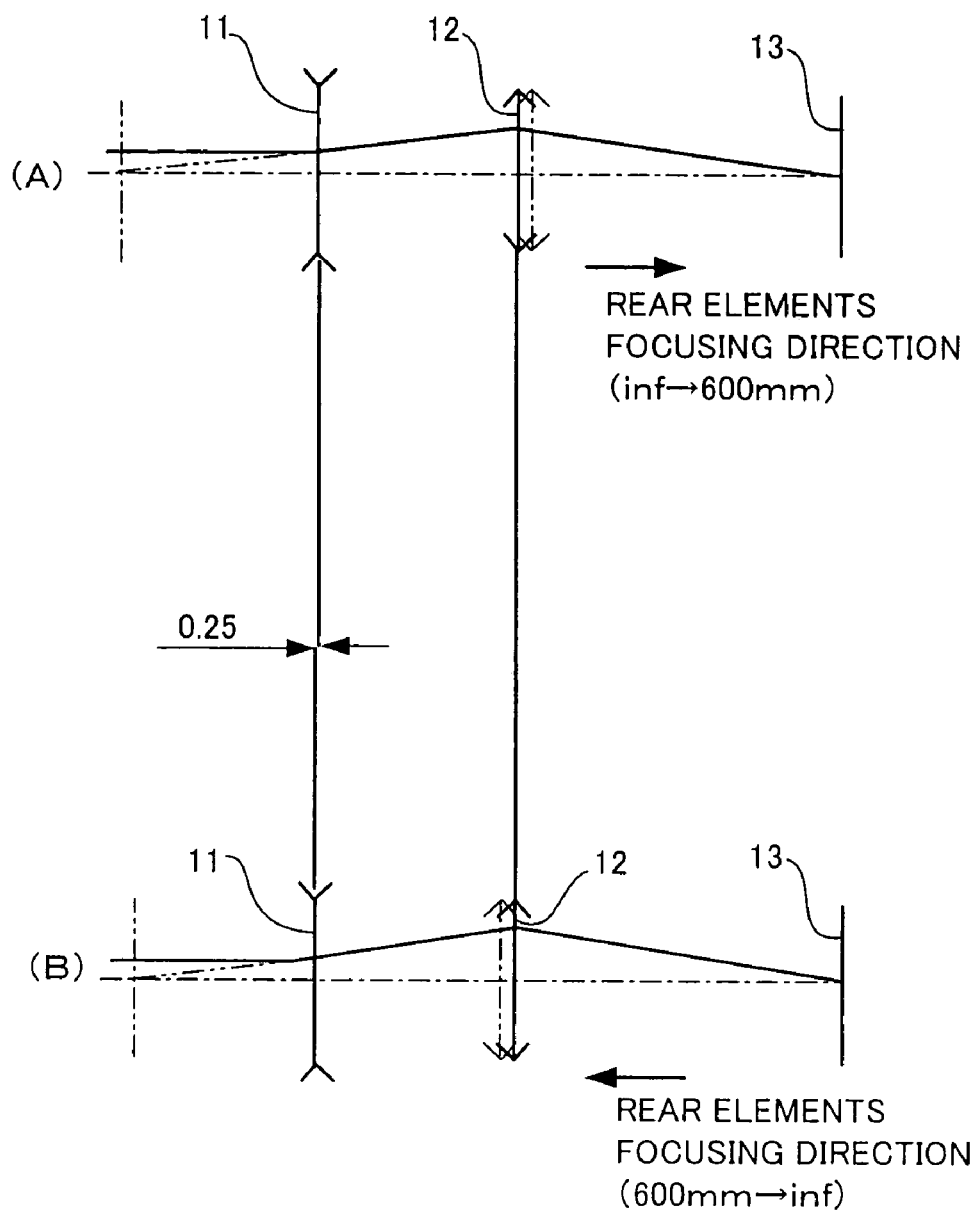
FIG. 7 is a view showing a comparison of zoom stage Z10 of Table 2 (FIG. 2) with zoom stage Z10 of Table 3 (FIG. 4).

FIG. 5 to FIG. 7 each shows a comparison of the lens position of the prior art of Table 2 (FIG. 2) with the embodiment 1 of Table 3 (FIG. 4).

FIG. 5 is a view showing a comparison of zoom stage Z6 of Table 2 (FIG. 2) with zoom stage Z6 of Table 3 (FIG. 4).

TABLE 3

Lens elements positions and focusing movement of the zoom lens of the embodiment 1

| | Z1 | Z2 | Z3 | Z4 | Z5 | Z6 | Z7 | Z8 | Z9 | Z10 |
|---|---|---|---|---|---|---|---|---|---|---|
| Focal length(reference position) | 5.64 | 6.13 | 6.70 | 7.34 | 8.12 | 9.02 | 10.13 | 11.52 | 13.29 | 15.63 |
| Focal length(inf) | 5.62 | 6.10 | 6.66 | 7.29 | 8.02 | 8.84 | 9.76 | 10.54 | 14.91 | 16.83 |
| Magnification of rear elements | −0.459 | −0.499 | −0.546 | −0.600 | −0.664 | −0.739 | −0.832 | −0.949 | −1.099 | −1.299 |
| Front element rear side main point-rear element front side main point | 20.44 | 18.64 | 16.88 | 15.19 | 13.55 | 11.97 | 10.42 | 8.90 | 7.42 | 5.99 |
| Front elements lens position | 36.69 | 35.30 | 34.02 | 32.88 | 31.90 | 31.09 | 30.49 | 30.17 | 30.24 | 30.85 |
| Rear elements lens position (600 mm) | 15.48 | 15.90 | 16.38 | 16.93 | 17.58 | 18.36 | 19.31 | 20.51 | 22.05 | 24.10 |
| Rear elements focusing movement (600 mm → inf) | −0.07 | −0.08 | −0.10 | −0.14 | −0.19 | −0.28 | −0.47 | −1.03 | 1.04 | 0.58 |

FIG. 4 is a view showing positions of the front elements and the rear elements at the respective zoom stages shown in Table 3 of the zoom lens of the characteristics shown in Table 1.

FIG. 4 shows the front elements of the embodiment 1 corresponding to Table 3 with the solid line, and shows the front elements position of the conventional zoom lens corresponding to Table 2 with the dashed line.

According to the embodiment 1, the position of the front elements is determined so as to satisfy the above-mentioned formula (3). As compared with the formula (2) of the prior art, the position of the front elements is shifted forward by $f_1^2/(m-f_1)=(-12.42)^2/(600+12.42)=0.25$ (mm) at any zoom stage.

With respect to the rear elements, the rear elements position, wherein an image taking apparatus is focused on the closest distance (here, 600 mm), is shown with the dotted line, and the rear elements position, wherein an image taking apparatus is focused on the infinite-point, is shown with the solid line. The rear elements position shown with the dotted line is completely same as the rear elements position, wherein an image taking apparatus is focused on the infinite-point, as shown with the solid line in FIG. 2.

When the rear elements position, wherein an image taking apparatus is focused on the closest distance, is set as a standard, for the zoom stages Z1 to Z8, a movement of the rear elements in a direction that the rear elements goes away from the front elements makes it possible to focus an image taking apparatus on an arbitrary subject distance between the closest distance and the infinite-point. And for the zoom stages Z9 to Z10, a movement of the rear elements in a direction that the rear elements approaches the front elements makes it possible to focus an image taking apparatus on an arbitrary subject distance between the closest distance and the infinite-point. In this case, the focal length after the focusing offers $f_1 f_2/(f_1+f_2-L)$.

Part (A) of FIG. 5 shows a position of the lens elements of the zoom stage Z6 of Table 2 (FIG. 2) according to the prior art. Part (B) of FIG. 5 shows a position of the lens elements of the zoom stage Z6 of Table 3 (FIG. 4) according to the embodiment 1.

With respect to the front elements 11, the position of part (B) of FIG. 5 according to the embodiment 1 is located forward by 0.25 mm than the position of part (A) of FIG. 5 according to the prior art. With respect to the rear elements 12, before the focusing, the position of part (B) of FIG. 5 according to the embodiment 1 is located at the same position of part (A) of FIG. 5 according to the prior art. However, in case of the part (A) of FIG. 5 according to the prior art, before the focusing, an image on the imaging plane 13 is focused on the infinite-point. On the other hand, in case of the part (B) of FIG. 5 according to the embodiment 1, before the focusing, an image on the imaging plane 13 is focused on the closest distance (here 600 mm).

To perform the focusing, in case of the part (A) of FIG. 5 according to the prior art, as will be understood from FIG. 2, a movement of the rear elements 12 in a direction that the rear elements 12 approaches the front elements 11 makes it possible to focus an image taking apparatus on an arbitrary subject distance between the infinite-point and the closest distance (here 600 mm). On the other hand, in case of the part (B) of FIG. 5 according to the embodiment 1, as will be understood from FIG. 4, a movement of the rear elements 12 in a direction that the rear elements 12 goes away from the front elements 11 makes it possible to focus an image taking apparatus on an arbitrary subject distance between the closest distance (here 600 mm) and the infinite-point.

FIG. 6 is a view showing a comparison of zoom stage Z8 of Table 2 (FIG. 2) with zoom stage Z8 of Table 3 (FIG. 4).

Part (A) of FIG. 6 shows a position of the lens elements of the zoom stage Z8 of Table 2 (FIG. 2) according to the prior art. Part (B) of FIG. 6 shows a position of the lens elements of the zoom stage Z8 of Table 3 (FIG. 4) according to the embodiment 1.

With respect to the front elements 11, the position of part (B) of FIG. 6 according to the embodiment 1 is located forward by 0.25 mm than the position of part (A) of FIG. 6 according to the prior art. With respect to the rear elements 12, before the focusing, the position of part (B) of FIG. 6 according to the embodiment 1 is located at the same position of part (A) of FIG. 6 according to the prior art. However, in case of the part (A) of FIG. 6 according to the prior art, before the focusing, an image on the imaging plane 13 is focused on the infinite-point. On the other hand, in case of the part (B) of FIG. 6 according-to the embodiment 1, before the focusing, an image on the imaging plane 13 is focused on the closest distance (here 600 mm).

In case of the part (A) of FIG. 6 according to the prior art, as shown in Table 2, in the state before the focusing, the lateral magnification of the rear elements is close to the direct magnification (−1.0), and thus it is impossible to implement the focusing and thereby impossible that the focusing position approaches the closest distance (here 600 mm).

On the other hand, in case of the part (B) of FIG. 6 according to the embodiment 1, a movement of the rear elements 12 in a direction that the rear elements 12 goes away from the front elements 11 makes it possible to focus an image taking apparatus on an arbitrary subject distance between the closest distance (here 600 mm) and the infinite-point.

FIG. 7 is a view showing a comparison of zoom stage. Z10 of Table 2 (FIG. 2) with zoom stage Z10 of Table 3 (FIG. 4).

Part (A) of FIG. 7 shows a position of the lens elements of the zoom stage Z10 of Table 2 (FIG. 2) according to the prior art. Part (B) of FIG. 7 shows a position of the lens elements of the zoom stage Z10 of Table 3 (FIG. 4) according to the embodiment 1.

With respect to the front elements 11, the position of part (B) of FIG. 7 according to the embodiment 1 is located forward by 0.25 mm than the position of part (A) of FIG. 7 according to the prior art. With respect to the rear elements 12, before the focusing, the position of part (B) of FIG. 7 according to the embodiment 1 is located at the same position of part (A) of FIG. 7 according to the prior art. However, in case of the part (A) of FIG. 7 according to the prior art, before the focusing, an image on the imaging plane 13 is focused on the infinite-point. On the other hand, in case of the part (B) of FIG. 7 according to the embodiment 1, before the focusing, an image on the imaging plane 13 is focused on the closest distance (here 600 mm).

To perform the focusing, in case of the part (A) of FIG. 7 according to the prior art, as will be understood from FIG. 2, a movement of the rear elements 12 in a direction that the rear elements 12 recedes from the front elements 11 makes it possible to focus an image taking apparatus on an arbitrary subject distance between the infinite-point and the closest distance (here 600 mm). On the other hand, in case of the part (B) of FIG. 7 according to the embodiment 1, as will be understood from FIG. 4, a movement of the rear elements 12 in a direction that the rear elements 12 approaches the front elements 11 makes it possible to focus an image taking apparatus on an arbitrary subject distance between the closest distance (here 600 mm) and the infinite-point.

Actually, there are needed a margin for focusing and a margin for guaranteeing a change of the focal point due to temperature and humidity, it is preferable that the front elements are set up at a position that the front elements are shifted to the subject side over a value as set forth below.

$$\frac{f_1^2}{m - f_1}$$

Further, it is recommended that a track of the front elements by a zooming is set up so that the front elements are disposed at a position to satisfy formulas (1) and (5) as set forth below.

$$T_1 \geq Ha_1 + HH_1 + L + HH_2 + \frac{f_2(f_1 - L)}{f_1 + f_2 - L} + \frac{f_1^2}{m - f_1} \quad (1)$$

$$T_1 \leq Ha_1 + HH_1 + L + HH_2 + \frac{f_2(f_1 - L)}{f_1 + f_2 - L} - f_1 \quad (5)$$

In the formula (5), in exceeding the upper limit, the subject length of the closest distance to be focused is inside the lens tip. And the front elements are extended forward beyond a necessity. This is contrary to the request for compactness.

The adoption of the above-mentioned focusing scheme makes it possible to always use the rear elements for the focusing.

For convenience of explanation, before the focusing, an image taking apparatus is focused on the closest distance (here, 600 mm), and in focusing the rear elements are moved from a position that an image forming apparatus is focused on the closest distance in a direction that the image forming apparatus is focused on the infinite-point. However, actually, there is no need that the rear elements always stand by at a position that an image taking apparatus is focused on the closest distance at each zoom stage, and it is acceptable that the rear elements stand by at a position that an image taking apparatus is focused on the infinite-point, and for a zooming, the rear elements are moved from the stand-by position in a direction that the image taking apparatus is focused on the closest distance.

Incidentally, with respect to the cam for driving the front elements, it is not restricted to the mechanical cam mechanism, and it is acceptable that a stop position is electrically controlled.

Figure 8:
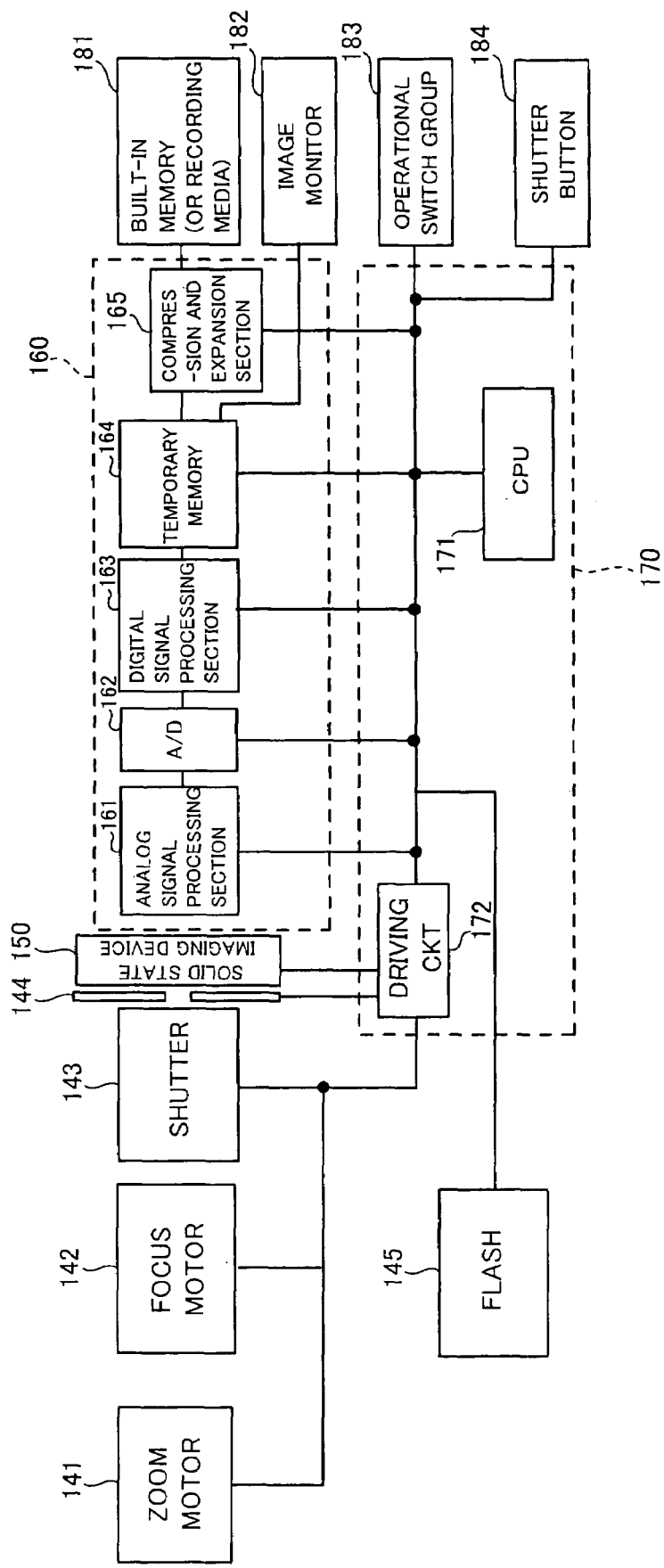
FIG. 8 is a block diagram of a digital camera according to an embodiment of the present invention.

FIG. 8 is a block diagram of a digital camera according to an embodiment of the present invention.

Figure 1:
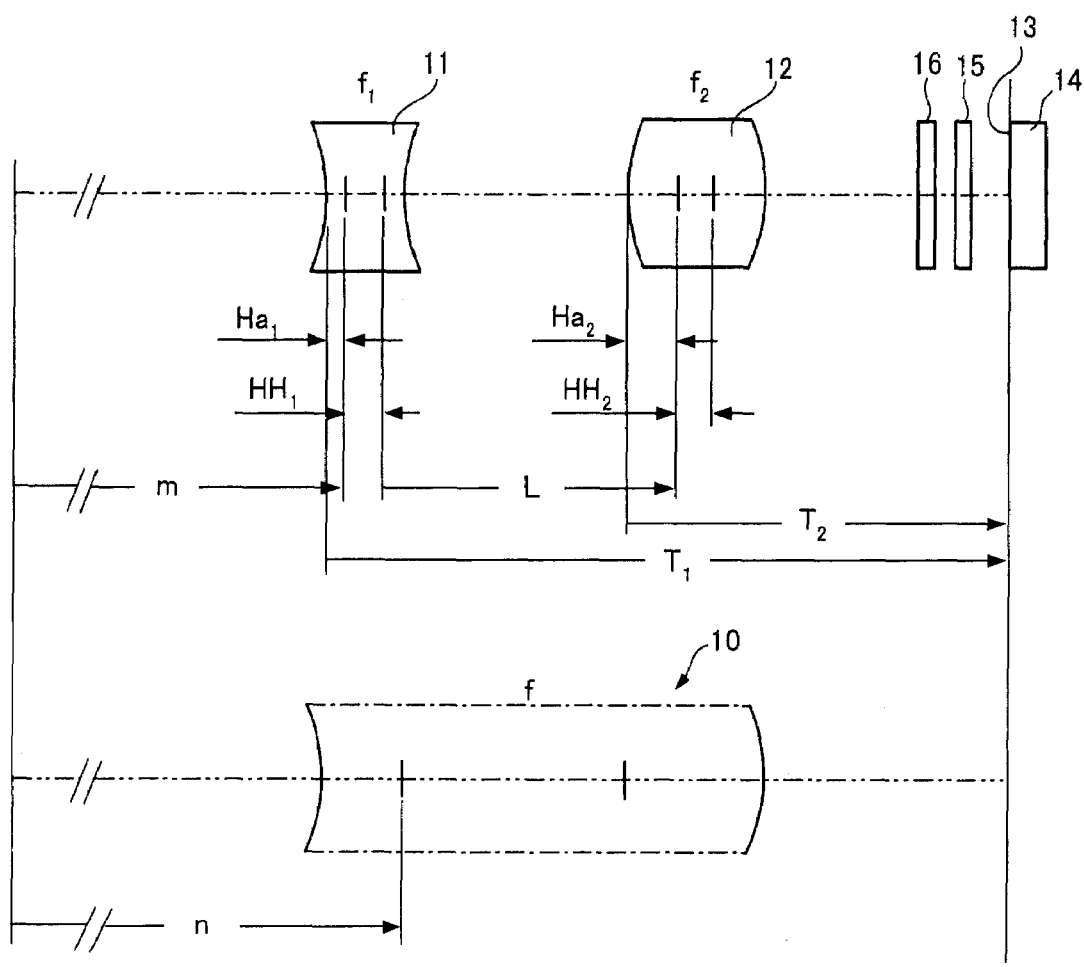
FIG. 1 is an explanatory view of symbols used in the specification.

In the digital camera shown in FIG. 8, as elements for a control of an optical system and a control of light quantity, there are provided a zoom motor 141, a focus motor 142, a shutter 143, and an aperture 144. A driving circuit 172, which will be described later, drives the zoom motor 141. The zoom motor 141 is a driving source for moving the front elements 11 and the rear elements 12 shown in FIG. 1 along the track explained referring to Table 1 and FIG. 3 to FIG. 7. The focus motor 142 is a driving source for moving the rear elements 12, for the purpose of focusing, as explained referring to Table 1 and FIG. 3 to FIG. 7. The shutter 143 is a member that permits the subject light entering via the zoom lens comprising the front elements 11 and the rear elements 12 shown in FIG. 1 to pass through only during a time from the shutter open to the shutter close. The aperture 144 is a member that permits the subject light of the light quantity according to the size of the aperture to pass through. The subject light, which enters via the zoom lens and passes through the shutter 143 and the aperture 144, is image-formed on a photo-electric plane of a solid state imaging device 150, so that the solid state imaging device 150 generates an analog image signal as an electric signal representative of the formed subject image. When the subject is dark, a flash 145 emits a flashlight to the subject. In FIG. 8, the cover glass 15 and the low-pass filter 16, which are shown in FIG. 1, are omitted in illustration.

The digital camera shown in FIG. 8 further comprises an image processing section 160 and a control section 170. The image processing section 160 comprises an analog signal processing section 161, an A/D converting section 162, a digital signal processing section 163, a temporary memory 164, and a compression and expansion section 165. The control section 170 comprises a CPU 171 and a driving circuit 172.

The driving circuit 172 of the control section 170 drives the zoom motor 141, a focus motor 142, the aperture 144 and the solid state imaging device 150 in accordance with an operation of an operational switch group 183 and a control of the CPU 171. And the driving circuit 172 drives open and shut operations of the shutter 143 in accordance with an operational timing of a shutter button 184. The CPU 171 controls the whole elements of the digital camera, such as the driving circuit 172, the flash 145 and the image processing section 160.

An analog image signal obtained by a solid state imaging device 150 is fed to the image processing section 160. And the analog image signal is subjected to the analog signal processing by the analog signal processing section 161 of the image processing section 160, and then converted into digital image data by the A/D converting section 162. The digital image data thus obtained is fed to the digital signal processing section 163 so as to be subjected to the digital signal processing, and then temporarily stored in the temporary memory 164, and further subjected to a compression processing in the compression and expansion section 165. The digital image data subjected to the compression processing is stored in a built-in memory (or recording media) 181. It is acceptable that the image data temporarily stored in the temporary memory 164 is fed to an image monitor 182 so as to be displayed on the image monitor 182 in form of an image. Further, it is acceptable that the image data stored in the built-in memory (or recording media) 181 is read therefrom so as to be subjected to be subjected to the expansion processing by the compression and expansion section 165 and then temporarily stored in the temporary memory 164, and the image data thus obtained is fed to the image monitor 182 so as to be displayed on the image monitor 182 in form of an image.

Figure 9:
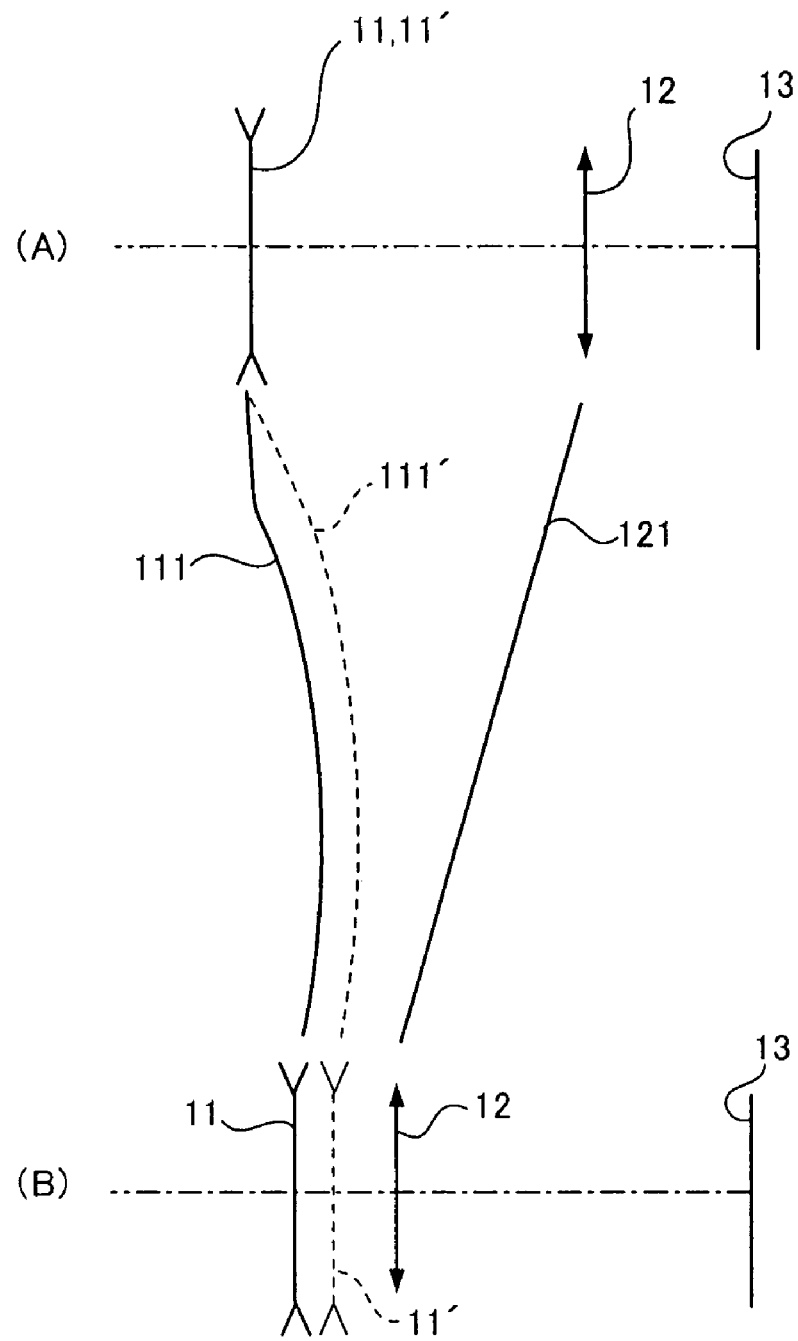
FIG. 9 is a view showing a zoom lens according to the second embodiment of the present invention.

FIG. 9 is a view showing a zoom lens according to the second embodiment of the present invention. Part (A) and part (B) of FIG. 9 show lens positions of the wide-angle edge and the telephoto edge of the zoom lens, respectively.

This zoom lens comprises, in a similar fashion to that of the first embodiment of the present invention as shown in FIG. 3, the front elements 11 having a negative power and the rear elements 12 having a positive power. Zooming operation causes the front elements 11 to move along a track 111 and causes the rear elements 12 to move along a track 121. In any zoom stages, the rear elements 12 move for focusing in accordance with the subject distance so that the subject is formed on an imaging plane 13 in the focusing state. In case of a digital camera, a solid state imaging device is disposed at the position which is coincident with the imaging plane 13. On the other hand, in case of a camera wherein photography is carried out on a photographic film, the photographic film is disposed at the imaging plane 13.

Front elements 11' and a track 111' of the front elements 11', which are shown with a broken line, denote the front elements position and the track position, respectively, which are set up in such a manner that the conventional concept that when the zooming is carried out, an image taking apparatus is focused on the infinite-point, that is, the above-mentioned formula (2), as set forth below, is satisfied.

$$T_1 = Ha_1 + HH_1 + L + HH_2 + \frac{f_2(f_1 - L)}{f_1 + f_2 - L_1} \quad (2)$$

In this case, as explained above, there appears an area wherein focusing is impossible on a part of the zooming area.

To the contrary, according to the present embodiment, the front elements 11 are disposed at the same position as the front elements 11' of the conventional example in the wide-angle edge (part (A) of FIG. 9). And the position of the front elements 11 is set up at the zoom stages other than the wide-angle edge in such a manner that the above-mentioned formula (3), as set forth below, is satisfied.

$$T_1 = Ha_1 + HH_1 + L + HH_2 + \frac{f_2(f_1 - L)}{f_1 + f_2 - L} + \frac{f_1^2}{m - f_1} \quad (3)$$

According to the first embodiment (cf. embodiment 1, table 3, FIG. 3 and FIG. 4), the front elements 11 are disposed at the position extended forward more than the conventional example in all the zooming areas. In this case, since the front elements 11 are extended forward more than the conventional example, the whole length of the lens at the time of photography is extended by the corresponding and thus the lens barrel is also extended. Accordingly, there is a possibility that thickness of the lens barrel is thicker at the time of the storage.

In view of the foregoing, according to the second embodiment, with respect to the wide-angle edge (zoom stage Z1), which has an effect on the whole length of the lens, the front elements 11 are disposed at the position of the formula (2) in which an image taking apparatus is focused on the infinite-point. On the other hands, with respect to the zoom stage Z2 to Z10, the front elements 11 are disposed at the position that the front elements 11 are extended by $f_1^2/(m-f_1)$ more than the track 111' of the front elements 11' in the conventional example.

As shown in Table 2 and FIG. 2, with respect to the zoom stage Z1 as the wide-angle edge, even if the conventional example is concerned, it is possible to perform a focussing control over a range from the infinite-point to the closest distance. Accordingly, also in accordance with the second embodiment, it is possible to use the rear elements 12 for focusing at all the zoom stages. Further, in accordance with the second embodiment, it is possible to reduce the whole length of the lens at the time of photography and thereby contributing to reducing the lens barrel and also to compactness and thinning.

The second embodiment corresponds to the embodiment of a second zoom lens according to the present invention, in which the front elements 11 are extended to a position that only the partial area including the direct magnification vicinity area, wherein the focusing is impossible in accordance with the conventional example, of the whole areas of zooming, satisfies the above-mentioned formula (1).

According to the second embodiment too, in a similar fashion to that of the first embodiment, it is preferable that the upper limit of the formula (5) is not exceeded.

Table 4 shows an example (embodiment 2) of the second embodiment. Also in the embodiment 2 shown in Table 4, characteristics of the lens elements are the same as those shown in Table 1. According to the embodiment 2, with respect to the zoom stage Z1, as shown in Table 4, the lateral magnification is −0.459 and is off from the direct magnification. Accordingly, even if the front elements 11 are disposed at the same position as the conventional example (cf. Table 2 and FIG. 2), it is possible to use the rear elements 12 as the focus lens.

Front elements 11' and a track 111' of the front elements 11', which are shown with a broken line, denote the front elements position and the track position, respectively, which are set up in such a manner that the conventional concept that when the zooming is carried out, an image taking apparatus is focused on the infinite-point, that is, the above-mentioned formula (2), as set forth below, is satisfied.

$$T_1 = Ha_1 + HH_1 + L + HH_2 + \frac{f_2(f_1 - L)}{f_1 + f_2 - L_1} \qquad (2)$$

TABLE 4

Lens elements positions and focusing movement
of the zoom lens of the embodiment 2
(only Z1 is the same as the conventional example)

|  | Z1 | Z2 | Z3 | Z4 | Z5 | Z6 | Z7 | Z8 | Z9 | Z10 |
|---|---|---|---|---|---|---|---|---|---|---|
| Focal length(reference position) | 5.70 | 6.13 | 6.70 | 7.34 | 8.12 | 9.02 | 10.13 | 11.52 | 13.29 | 15.63 |
| Focal length(inf) | 5.70 | 6.10 | 6.66 | 7.29 | 8.02 | 8.84 | 9.76 | 10.54 | 14.91 | 16.83 |
| Magnification of rear elements | −0.459 | −0.499 | −0.546 | −0.600 | −0.664 | −0.739 | −0.832 | −0.949 | −1.099 | −1.299 |
| Front element rear side main point-rear element front side main point | 20.19 | 18.64 | 16.88 | 15.19 | 13.55 | 11.97 | 10.42 | 8.90 | 7.42 | 5.99 |
| Front elements lens position | 36.44 | 35.30 | 34.02 | 32.88 | 31.90 | 31.09 | 30.49 | 30.17 | 30.24 | 30.85 |
| Rear elements lens position | 15.48 | 15.90 | 16.38 | 16.93 | 17.58 | 18.36 | 19.31 | 20.51 | 22.05 | 24.10 |
| Rear elements focusing movement (600 mm → inf) | 0.07 | −0.08 | −0.10 | −0.14 | −0.19 | −0.28 | −0.47 | −1.03 | 1.04 | 0.58 |

Incidentally, the digital camera, which is provided with the zoom lens according to the second embodiment, has the same structure as that shown in FIG. 1 and FIG. 8, except for a point that the zoom motor 141 and the focus motor 142, which are shown in FIG. 8, drive the front elements 11 and the rear elements 12 shown in FIG. 1 and the rear elements 12, respectively, in the manner as explained referring to Table 4 and FIG. 9. Accordingly, the redundant explanation will be omitted.

Figure 10:
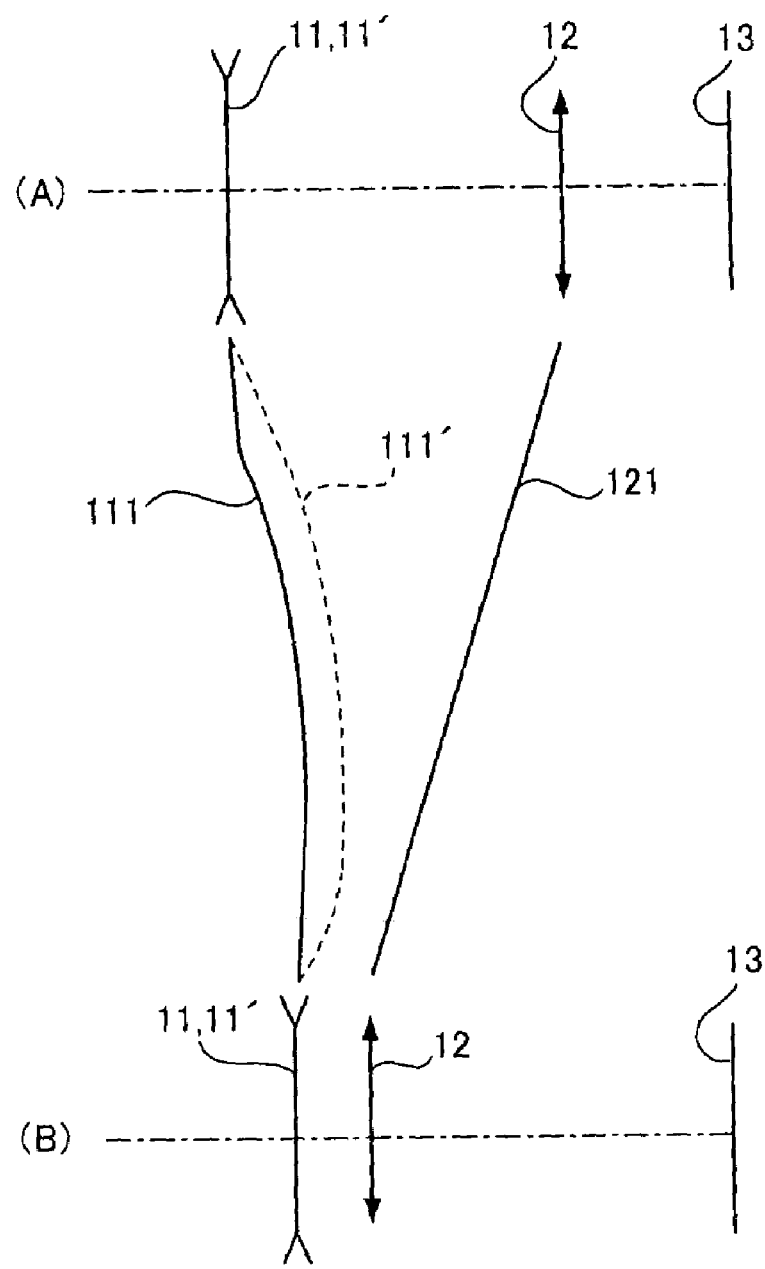
FIG. 10 is a view showing a zoom lens according to the third embodiment of the present invention.

FIG. 10 is a view showing a zoom lens according to the third embodiment of the present invention. Part (A) and part (B) of FIG. 10 show lens positions of the wide-angle edge and the telephoto edge of the zoom lens, respectively.

This zoom lens comprises, in a similar fashion to that of the first embodiment as shown in FIG. 3 and the second embodiment as shown in FIG. 9, the front elements 11 having a negative power and the rear elements 12 having a positive power. Zooming operation causes the front elements 11 to move along a track 111 and causes the rear elements 12 to move along a track 121. In any zoom stages, the rear elements 12 move for focusing in accordance with the subject distance so that the subject is formed on an imaging plane 13 in the focusing state. In case of a digital camera, a solid state imaging device is disposed at the position which is coincident with the imaging plane 13. On the other hand, in case of a camera wherein photography is carried out on a photographic film, the photographic film is disposed at the imaging plane 13.

In this case, as explained above, there appears an area wherein focusing is impossible on a part of the zooming area.

To the contrary, according to the present embodiment, the front elements 11 are disposed at the same position as the front elements 11' of the conventional example in two points of the wide-angle edge (part (A) of FIG. 10) and the telephoto edge (part (B) of FIG. 10) of the zoom lens. And the position of the front elements 11 is set up at the zoom stages other than the wide-angle edge and the telephoto edge in such a manner that the above-mentioned formula (3), as set forth below, is satisfied.

$$T_1 = Ha_1 + HH_1 + L + HH_2 + \frac{f_2(f_1 - L)}{f_1 + f_2 - L} + \frac{f_1^2}{m - f_1} \qquad (3)$$

According to the embodiment 2 shown in Table 4, with respect to the wide-angle edge (zoom stage Z1), which has an effect on the whole length of the lens, the front elements 11 are left in the conventional position. In case of a camera having a tele-macro mode in which a macro-photography is performed in a state that a zoom lens is set in zooming on the telephoto edge, it is preferable that also with respect to the telephoto edge (zoom stage Z10), the front elements 11 are left in the conventional position. In case of the tele-macro, there is a need that the front elements 11 are extended greatly, and thus the focal length is large in change. Further, when the rear elements 12 are used for focusing in this condition, there will occur a problem of time lag. In view of the foregoing, in case of is the third embodiment as shown in FIG. 10, with respect to two points of the wide-angle edge (zoom stage Z1) shown in part (A) of FIG. 10 and the telephoto edge (zoom stage Z10) shown in part (B) of FIG. 10, the front elements 11 are disposed at the position satisfying the formula (2) in a similar fashion to that of the conventional example. On the other hands, with respect to the zoom stage Z2 to Z9, the front elements 11 are disposed at the position that the front elements 11 are extended by $f_1^2/(m-f_1)$ more than the track 111' of the front elements 11' in the conventional example, rather than the position satisfying the formula (2).

Table 5 shows an example (embodiment 3) of the third embodiment. Also in the embodiment 3 shown in Table 5, characteristics of the lens elements are the same as those shown in Table 1. According to the embodiment 3, with respect to the zoom stage Z1, as shown in Table 2 and Table 4, the lateral magnification of the rear elements 12 is −0.459 and is off from the direct magnification. And also with respect to the zoom stage Z10, the lateral magnification of the rear elements 12 is −1.299 (it is the same as one shown in Table 2) and is off from the direct magnification. Accordingly, also with respect to the zoom stages Z1 and Z10, it is possible to focus an image taking apparatus on an arbitrary subject distance between the infinite-point and the closest distance using only the rear elements 12 as the focus lens group.

In case of the third embodiment, it is suitable for both the compactness and the tele-macro mode.

Incidentally, the digital camera, which is provided with the zoom lens according to the third embodiment, has the same structure as that shown in FIG. 1 and FIG. 8, except for a point that the zoom motor 141 and the focus motor 142, which are shown in FIG. 8, drive the front elements 11 and the rear elements 12 shown in FIG. 1 and the rear elements 12, respectively, in the manner as explained referring to Table 5 and FIG. 10. Accordingly, the redundant explanation will be omitted.

Figure 11:
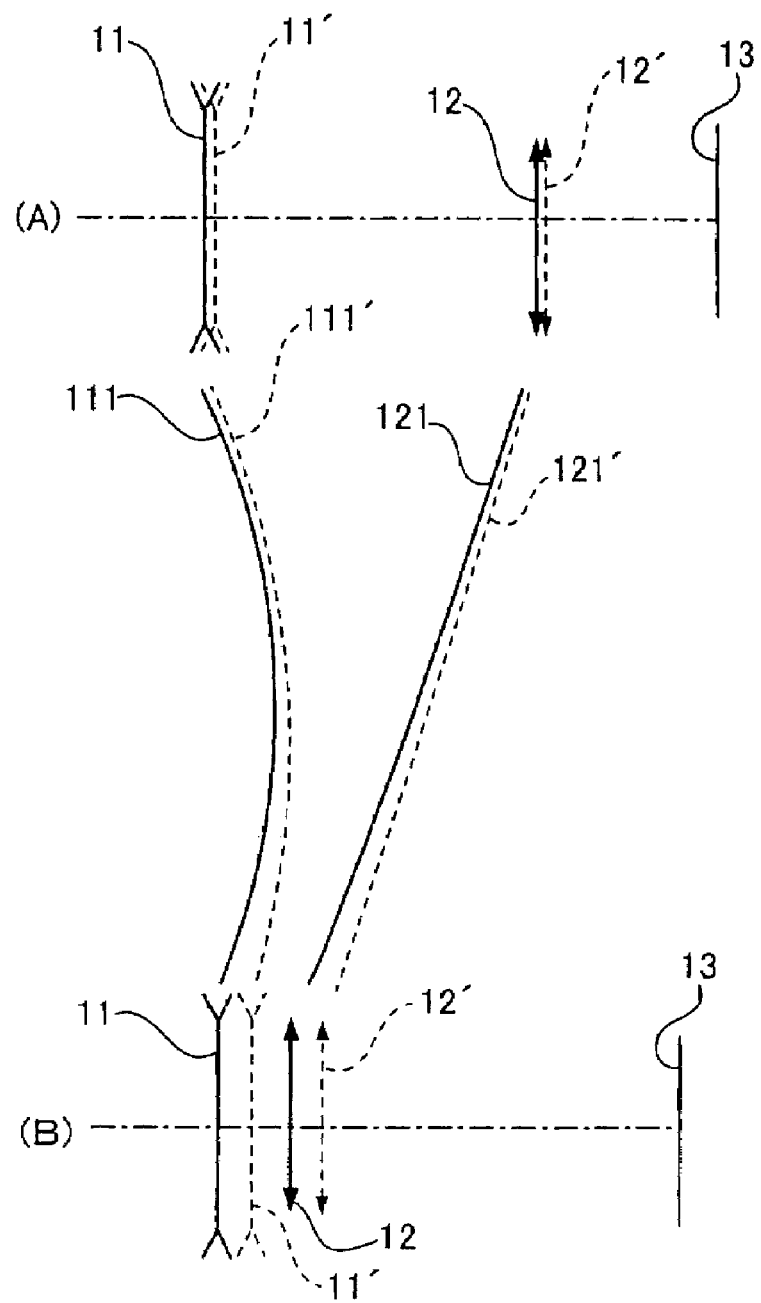
FIG. 11 is a view showing a zoom lens according to the fourth embodiment of the present invention.

FIG. 11 is a view showing a zoom lens according to the fourth embodiment of the present invention. Part (A) and part (B) of FIG. 11 show lens positions of the wide-angle edge and the telephoto edge of the zoom lens, respectively.

This zoom lens comprises the front elements 11 having a negative power and the rear elements 12 having a positive power. Zooming operation causes the front elements 11 to move along a track 111 and causes the rear elements 12 to move along a track 121. In any zoom stages, the rear elements 12 move for focusing in accordance with the subject distance so that the subject is formed on an imaging plane 13 in the focusing state. In case of a digital camera, a solid state imaging device is disposed at the position, which is coincident with the imaging plane 13. On the other hand, in case of a camera wherein photography is carried out on a photographic film, the photographic film is disposed at the imaging plane 13.

Front elements 11', rear elements 12' and track 111' and 121' of the front elements 11' and the rear elements 12', which are shown with a broken line, denote the front elements position, the rear elements position and the track

TABLE 5

Lens elements positions and focusing movement
of the zoom lens of the embodiment 3
(Z1 and Z10 are the same as the conventional example)

|  | Z1 | Z2 | Z3 | Z4 | Z5 | Z6 | Z7 | Z8 | Z9 | Z10 |
|---|---|---|---|---|---|---|---|---|---|---|
| Focal length(reference position) | 5.70 | 6.13 | 6.70 | 7.34 | 8.12 | 9.02 | 10.13 | 11.52 | 13.29 | 16.13 |
| Focal length(inf) | 5.70 | 6.10 | 6.66 | 7.29 | 8.02 | 8.84 | 9.76 | 10.54 | 14.91 | 16.13 |
| Magnification of rear elements | −0.459 | −0.499 | −0.546 | −0.600 | −0.664 | −0.739 | −0.832 | −0.949 | −1.099 | −1.299 |
| Front element rear side main point-rear element front side main point | 20.19 | 18.64 | 16.88 | 15.19 | 13.55 | 11.97 | 10.42 | 8.90 | 7.42 | 5.74 |
| Front elements lens position | 36.44 | 35.30 | 34.02 | 32.88 | 31.90 | 31.09 | 30.49 | 30.17 | 30.24 | 30.60 |
| Rear elements lens position | 15.48 | 15.90 | 16.38 | 16.93 | 17.58 | 18.36 | 19.31 | 20.51 | 22.05 | 24.10 |
| Rear elements focusing movement (600 mm → inf) | 0.07 | −0.08 | −0.10 | −0.14 | −0.19 | −0.28 | −0.47 | −1.03 | 1.04 | −0.67 |

In a similar fashion to that of the second embodiment, the third embodiment corresponds to the embodiment of a second zoom lens according to the present invention, in which the front elements 11 are extended to a position that only the partial area including the direct magnification vicinity area, wherein the focusing is impossible in accordance with the conventional example, of the whole areas of zooming, satisfies the above-mentioned formula (1).

According to the third embodiment too, in a similar fashion to that of the first embodiment and the second embodiment, it is preferable that the upper limit of the formula (5) is not exceeded.

positions of the front elements and the rear elements, respectively, which are set up in such a manner that the conventional concept that when the zooming is carried out, an image taking apparatus is focused on the infinite-point, that is, with respect to the front elements, the above-mentioned formula (2), as set forth below, is satisfied, $$T_1 = Ha_1 + HH_1 + L + HH_2 + \frac{f_2(f_1 - L)}{f_1 + f_2 - L_1} \qquad (2)$$

and with respect to the rear elements, formula (20), as set forth below, in which a sign of inequality of the above-mentioned formula (18) is replaced by a sign of equality, is satisfied.

$$T_2 = Ha_2 + HH_2 + \frac{f_2(f_1 - L)}{f_1 + f_2 - L} \quad (20)$$

In this case, as explained above referring to Table 2 and FIG. 2, there appears an area wherein focusing is impossible on a part of the zooming area.

To the contrary, the front elements 11, the rear elements 12 and the track 111 and 121 of the front elements 11 and the rear elements 12, which are shown with a solid line, denote the front elements position, the rear elements position and the track positions of the front elements and the rear elements, respectively, which are set up in such a manner that the above-mentioned formulas (8) and (9), as set forth below, are satisfied, $$T_1 \geq Ha_1 + HH_1 + L + HH_2 + \frac{f_2(f_1 - L)}{f_1 + f_2 - L} + \frac{f^2}{n - f} \quad (8)$$

$$T_2 \geq Ha_2 + HH_2 + \frac{f_2(f_1 - L)}{f_1 + f_2 - L} + \frac{f^2}{n - f} \quad (9)$$

In this case, as will be described more in detail hereinafter, it is possible for anyone of the zoom stages to focus on anyone of the subject distances between the closest distance to the infinite-point. As described above, a sign of inequality of the formulas (8) and (9) is for compensating for the margin or the error, and logically the front elements position and the track position are set up in such a manner that the above-mentioned formulas (10) and (11), as set forth below, in which a sign of inequality of the formulas (8) and (9) are replaced by a sign of equality, are satisfied.

$$T_1 = Ha_1 + HH_1 + L + HH_2 + \frac{f_2(f_1 - L)}{f_1 + f_2 - L} + \frac{f^2}{n - f} \quad (10)$$

$$T_2 = Ha_2 + HH_2 + \frac{f_2(f_1 - L)}{f_1 + f_2 - L} + \frac{f^2}{n - f} \quad (11)$$

Table 6 shows lens elements positions and focusing movement of the zoom lens adopting the lens elements having the focal lengths of lens elements and main points positions shown in the table 1, according to the fourth embodiment (embodiment 4) of the present invention.

TABLE 6

Lens elements positions and focusing movement of the zoom lens of the embodiment 4

|  | Z1 | Z2 | Z3 | Z4 | Z5 | Z6 | Z7 | Z8 | Z9 | Z10 |
| --- | --- | --- | --- | --- | --- | --- | --- | --- | --- | --- |
| Focal length(reference position) | 5.70 | 6.20 | 6.78 | 7.45 | 8.24 | 9.18 | 10.33 | 11.78 | 13.65 | 16.13 |
| Focal length(inf) | 5.68 | 6.18 | 6.75 | 7.39 | 8.14 | 8.99 | 9.92 | 10.61 | 15.11 | 17.31 |
| Magnification of rear elements | −0.459 | −0.499 | −0.546 | −0.600 | −0.664 | −0.739 | −0.832 | −0.949 | −1.099 | −1.299 |
| Front side main point of whole system | 10.12 | 10.02 | 9.90 | 9.77 | 9.61 | 9.43 | 9.24 | 9.09 | 8.14 | 7.71 |
| Front element rear side main point- rear element front side main point | 20.19 | 18.39 | 16.63 | 14.94 | 13.30 | 11.72 | 10.17 | 8.65 | 7.17 | 5.74 |
| Front elements lens position | 36.49 | 35.11 | 33.85 | 32.72 | 31.76 | 30.98 | 30.42 | 30.15 | 30.3 | 31.04 |
| Rear elements lens position | 15.53 | 15.96 | 16.46 | 17.02 | 17.69 | 18.5 | 19.49 | 20.74 | 22.36 | 24.54 |
| Rear elements focusing movement (600 mm inf) | −0.07 | −0.08 | −0.10 | −0.14 | −0.20 | −0.30 | −0.52 | −1.20 | 0.9 | 0.54 |

Figure 12:
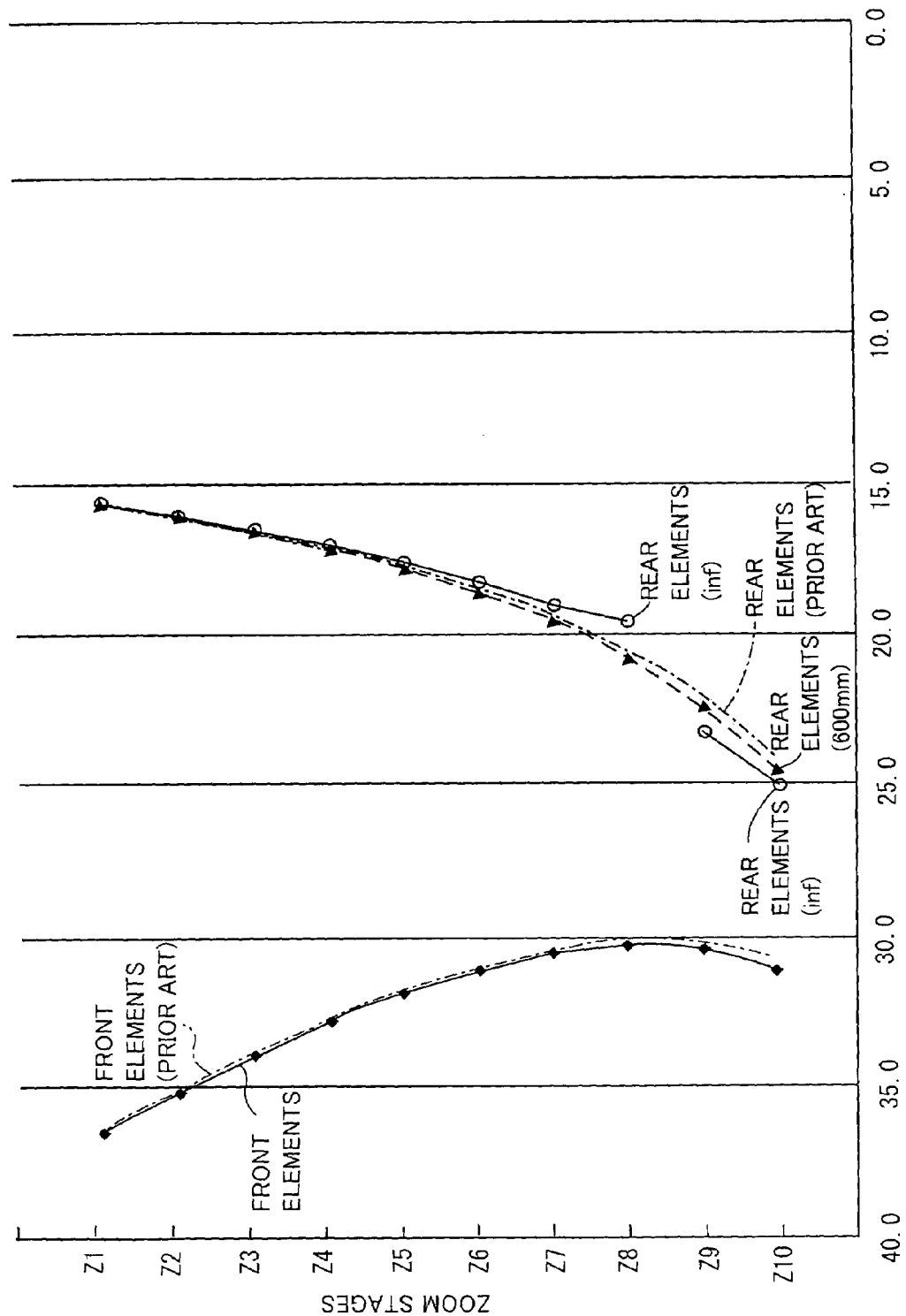
FIG. 12 is a view showing positions of the front elements and the rear elements at the respective zoom stages shown in Table 6 of the zoom lens of the characteristics shown in Table 1.

FIG. 12 is a view showing positions of the front elements and the rear elements at the respective zoom stages shown in Table 6 of the zoom lens of the characteristics shown in Table 1.

FIG. 12 shows the front elements of the embodiment 4 corresponding to Table 6 with the solid line, and shows the front elements position of the conventional zoom lens corresponding to Table 2 with the dashed line.

According to the embodiment 4, the position of the front elements is determined so as to satisfy the above-mentioned formula (10). As compared with the formula (2) of the conventional example, the position of the front elements is shifted forward by the distance according to the associated zoom stage.

With respect to the rear elements, the rear elements position according to the formula (11), wherein the closest distance is 600 mm, is shown with the dotted line, and the rear elements position, wherein an image taking apparatus is focused on the infinite-point, is shown with the solid line. The rear elements position shown with the dashed line denotes conventional example. The position shown with the dashed line is a position wherein an image taking apparatus is focused on the infinite-point when the front elements 11 is located at the position shown with the dashed line.

When the rear elements position, wherein an image taking apparatus is focused on the closest distance, is set as a standard, for the zoom stages Z1 to Z8, a movement of the rear elements in a direction that the rear elements goes away from the front elements makes it possible to focus an image taking apparatus on an arbitrary subject distance between the closest distance and the infinite-point. And for the zoom stages Z9 to Z10, a movement of the rear elements in a direction that the rear elements approaches the front elements makes it possible to focus an image taking apparatus on an arbitrary subject distance between the closest distance and the infinite-point.

Figure 13:
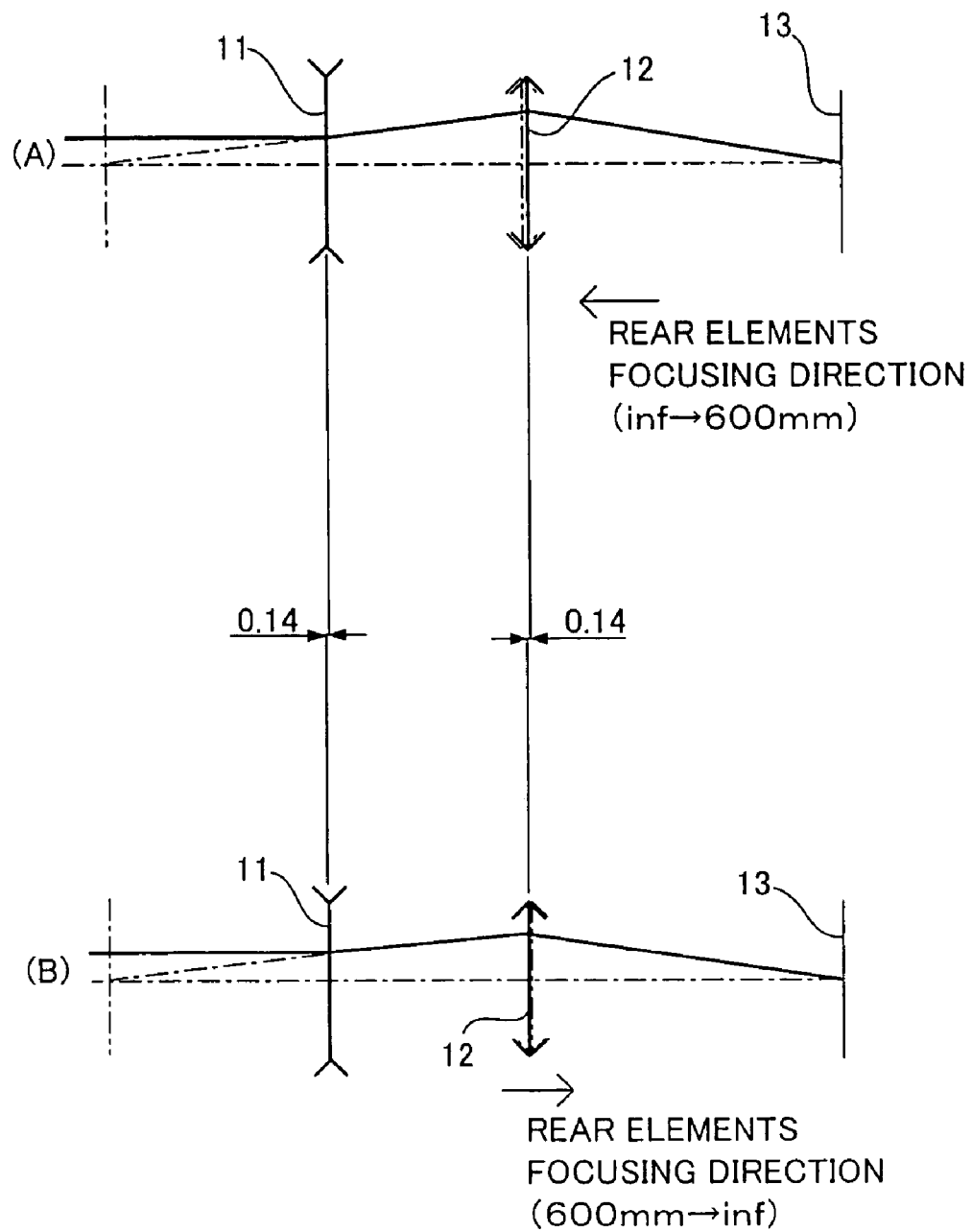
FIG. 13 is a view showing a comparison of zoom stage Z6 of Table 2 (FIG. 2) with zoom stage Z6 of Table 6 (FIG. 12).
Figure 14:
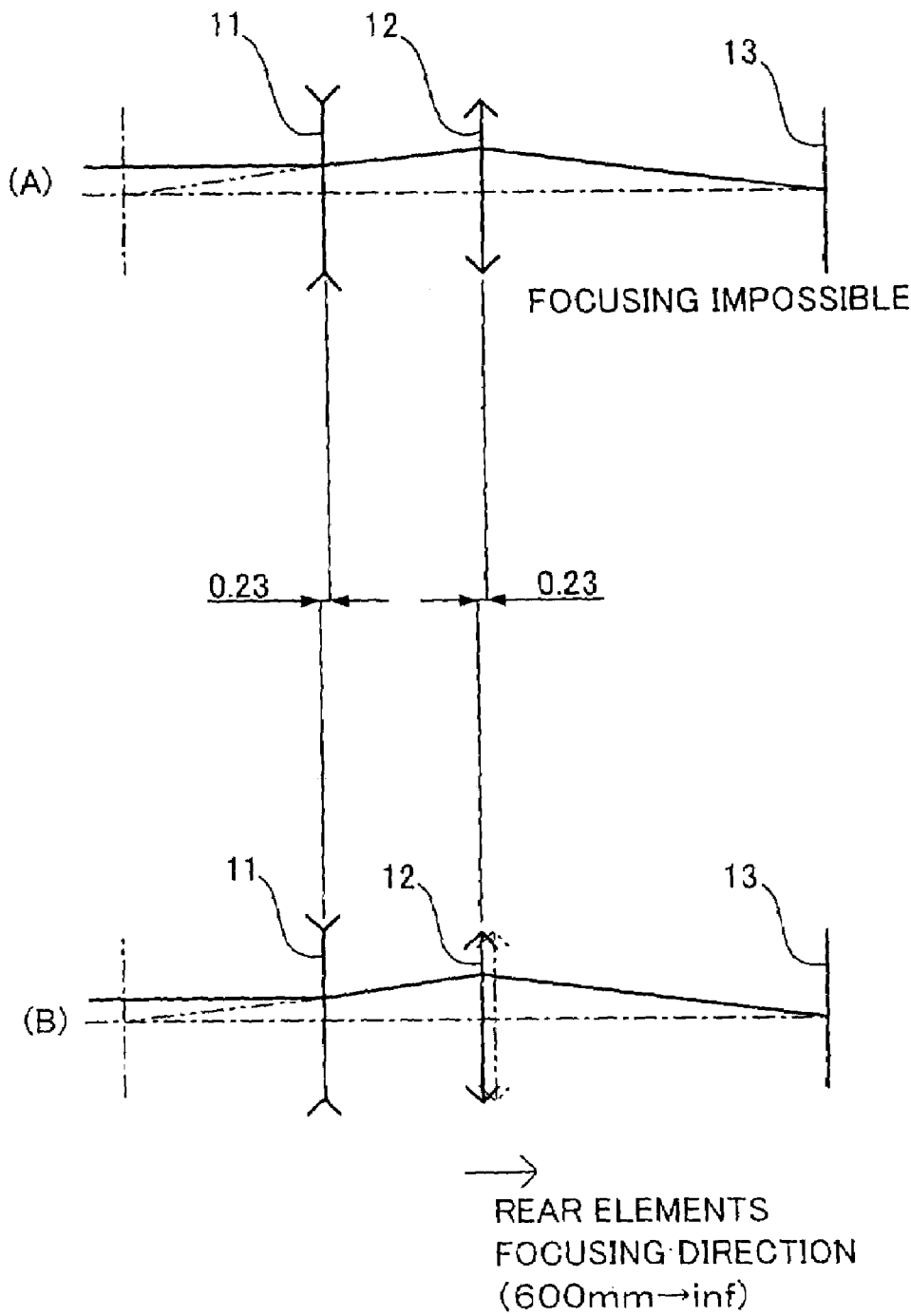
FIG. 14 is a view showing a comparison of zoom stage Z8 of Table 2 (FIG. 2) with zoom stage Z8 of Table 6 (FIG. 12).
Figure 15:
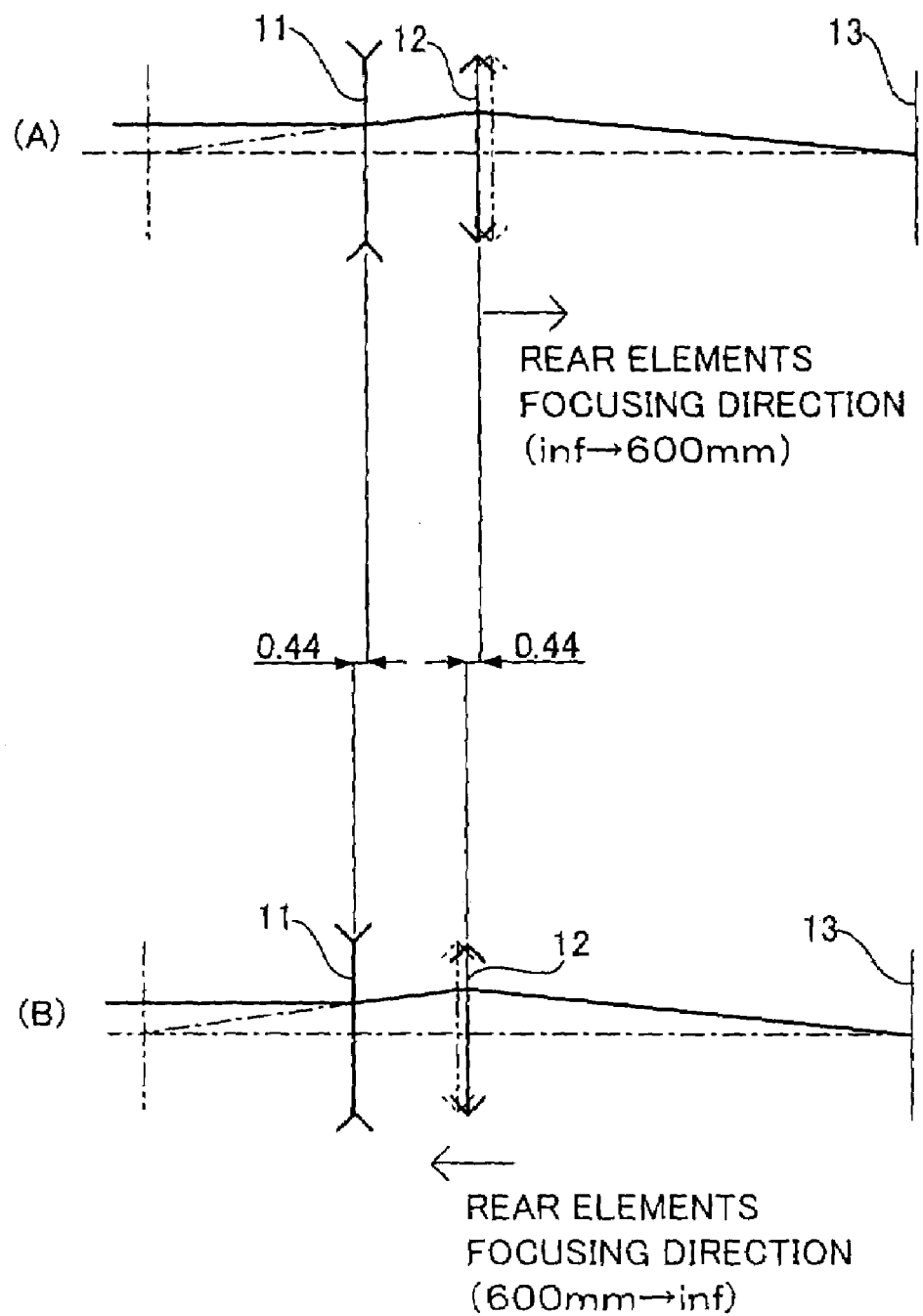
FIG. 15 is a view showing a comparison of zoom stage Z10 of Table 2 (FIG. 2) with zoom stage Z10 of Table 6 (FIG. 12).

FIG. 13 to FIG. 15 each shows a comparison of the lens position of the prior art of Table 2 (FIG. 2) with the embodiment 4 of Table 6 (FIG. 12).

FIG. 13 is a view showing a comparison of zoom stage Z6 of Table 2 (FIG. 2) with zoom stage Z6 of Table 6 (FIG. 12).

Part (A) of FIG. 13 shows a position of the lens elements of the zoom stage Z6 of Table 2 (FIG. 2) according to the prior art. Part (B) of FIG. 13 shows a position of the lens elements of the zoom stage Z6 of Table 6 (FIG. 12) according to the embodiment 4.

With respect to the front elements 11, the position of part (B) of FIG. 13 according to the embodiment 4 is located forward by 0.14 mm than the position of part (A) of FIG. 13 according to the prior art. Also with respect to the rear elements 12, before the focusing, the position of part (B) of FIG. 13 according to the embodiment 4 is located forward by 0.14 mm than the position of part (A) of FIG. 13 according to the prior art. However, in case of the part (A) of FIG. 13 according to the prior art, before the focusing, an image on the imaging plane 13 is focused on the infinite-point. On the other hand, in case of the part (B) of FIG. 13 according to the embodiment 4, before the focusing, an image on the imaging plane 13 is focused on the closest distance (here 600 mm).

To perform the focusing, in case of the part (A) of FIG. 13 according to the prior art, as will be understood from FIG. 2, a movement of the rear elements 12 in a direction that the rear elements 12 approaches the front elements 11 makes it possible to focus an image taking apparatus on an arbitrary subject distance between the infinite-point and the closest distance (here 600 mm). On the other hand, in case of the part (B) of FIG. 13 according to the embodiment 4, as will be understood from FIG. 12, a movement of the rear elements 12 in a direction that the rear elements 12 goes away from the front elements 11 makes it possible to focus an image taking apparatus on an arbitrary subject distance between the closest distance (here 600 mm) and the infinite-point.

FIG. 14 is a view showing a comparison of zoom stage Z8 of Table 2 (FIG. 2) with zoom stage Z8 of Table 6 (FIG. 12).

Part (A) of FIG. 14 shows a position of the lens elements of the zoom stage Z8 of Table 2 (FIG. 2) according to the prior art. Part (B) of FIG. 14 shows a position of the lens elements of the zoom stage Z8 of Table 6 (FIG. 12) according to the embodiment 4.

With respect to the front elements 11, the position of part (B) of FIG. 14 according to the embodiment 4 is located forward by 0.23 mm than the position of part (A) of FIG. 14 according to the prior art. Also with respect to the rear elements 12, before the focusing, the position of part (B) of FIG. 14 according to the embodiment 4 is located forward by 0.23 mm than the position of part (A) of FIG. 14 according to the prior art. However, in case of the part (A) of FIG. 14 according to the prior art, before the focusing, an image on the imaging plane 13 is focused on the infinite-point. On the other hand, in case of the part (B) of FIG. 14 according to the embodiment 4, before the focusing, an image on the imaging plane 13 is focused on the closest distance (here 600 mm).

In case of the part (A) of FIG. 14 according to the prior art, as shown in Table 2, in the state before the focusing, the lateral magnification of the rear elements is close to the direct magnification (−1.0), and thus it is impossible to implement the focusing and thereby impossible that the focusing position approaches the closest distance (here 600 mm).

On the other hand, in case of the part (B) of FIG. 14 according to the embodiment 4, a movement of the rear elements 12 in a direction that the rear elements 12 goes away from the front elements 11 makes it possible to focus an image taking apparatus on an arbitrary subject distance between the closest distance (here 600 mm) and the infinite-point.

FIG. 15 is a view showing a comparison of zoom stage Z10 of Table 2 (FIG. 2) with zoom stage Z10 of Table 6 (FIG. 12).

Part (A) of FIG. 15 shows a position of the lens elements of the zoom stage Z10 of Table 2 (FIG. 2) according to the prior art. Part (B) of FIG. 15 shows a position of the lens elements of the zoom stage Z10 of Table 6 (FIG. 12) according to the embodiment 4.

With respect to the front elements 11 and the rear elements 12 before focusing, the position of part (B) of FIG. 15 according to the embodiment 4 is located forward by 0.44 mm than the position of part (A) of FIG. 15 according to the prior art. However, in case of the part (A) of FIG. 15 according to the prior art, before the focusing, an image on the imaging plane 13 is focused on the infinite-point. On the other hand, in case of the part (B) of FIG. 15 according to the embodiment 4, before the focusing, an image on the imaging plane 13 is focused on the closest distance (here 600 mm).

To perform the focusing, in case of the part (A) of FIG. 15 according to the prior art, as will be understood from FIG. 2, a movement of the rear elements 12 in a direction that the rear elements 12 recedes from the front elements 11 makes it possible to focus an image taking apparatus on an arbitrary subject distance between the infinite-point and the closest distance (here 600 mm). On the other hand, in case of the part (B) of FIG. 15 according to the embodiment 4, as will be understood from FIG. 12, a movement of the rear elements 12 in a direction that the rear elements 12 approaches the front elements 11 makes it possible to focus an image taking apparatus on an arbitrary subject distance between the closest distance (here 600 mm) and the infinite-point.

Actually, there are needed a margin for focusing and a margin for guaranteeing a change of the focal point due to temperature and humidity, it is preferable that the front elements are set up at a position that both the front elements and the rear elements are shifted to the subject side over a value as set forth below.

$$\frac{f^2}{n-f}$$

Further, it is recommended that a track of the front elements by a zooming is set up so that the front elements are disposed at a position to satisfy formulas (8) and (14) as set forth below, $$T_1 \geq Ha_1 + HH_1 + L + HH_2 + \frac{f_2(f_1 - L)}{f_1 + f_2 - L} + \frac{f^2}{n - f} \quad (8)$$

$$T_1 \leq Ha_1 + HH_1 + L + HH_2 + \frac{f_2(f_1 - L)}{f_1 + f_2 - L} - f \quad (14)$$

and the rear elements are disposed at a position to satisfy formulas (9) and (15) as set forth below.

$$T_2 \geq Ha_2 + HH_2 + \frac{f_2(f_1 - L)}{f_1 + f_2 - L} + \frac{f^2}{n - f} \quad (9)$$

$$T_2 \leq Ha_2 + HH_2 + \frac{f_2(f_1 - L)}{f_1 + f_2 - L} - f \quad (15)$$

In the formulas (15) and (16), in exceeding the upper limit, the subject length of the closest distance to be focused is inside the lens tip. And the front elements are extended forward beyond a necessity. This is contrary to the request for compactness.

The adoption of the above-mentioned focusing scheme makes it possible to always use the rear elements for the focusing.

For convenience of explanation, before the focusing, an image taking apparatus is focused on the closest distance (here, 600 mm), and in focusing the rear elements are moved from a position that an image forming apparatus is focused on the closest distance in a direction that the image forming apparatus is focused on the infinite-point. However, actually, there is no need that the rear elements always stand by at a position that an image taking apparatus is focused on the closest distance at each zoom stage, and it is acceptable that the rear elements stand by at a position that an image taking apparatus is focused on the infinite-point, and for a zooming, the rear elements are moved from the stand-by position in a direction that the image taking apparatus is focused on the closest distance.

Incidentally, with respect to the cam for driving the front elements, it is not restricted to the mechanical cam mechanism, and it is acceptable that a stop position is electrically controlled.

Incidentally, the digital camera, which is provided with the zoom lens according to the fourth embodiment, has the same structure as that-shown in FIG. 1 and FIG. 8, except for a point that the zoom motor 141 and the focus motor 142, which are shown in FIG. 8, drive the front elements 11 and the rear elements 12 shown in FIG. 1 and the rear elements 12, respectively, in the manner as explained referring to Table 6 and FIGS. 12 to 15. Accordingly, the redundant explanation will be omitted.

Figure 16:
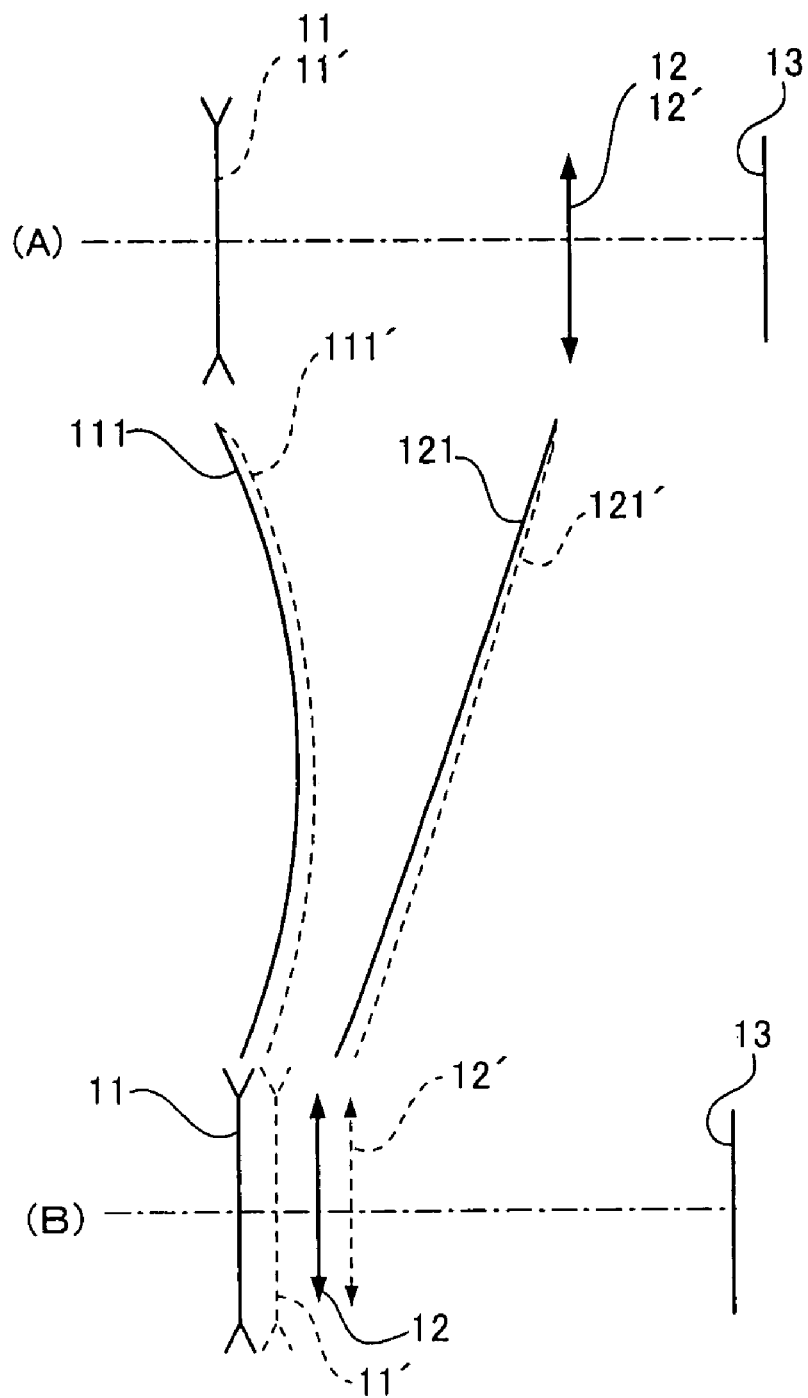
FIG. 16 is a view showing a zoom lens according to the fifth embodiment of the present invention.

FIG. 16 is a view showing a zoom lens according to the fifth embodiment of the present invention. Part (A) and part (B) of FIG. 16 show lens positions of the wide-angle edge and the telephoto edge of the zoom lens, respectively.

This zoom lens comprises, in a similar fashion to that of the fourth embodiment as shown in FIG. 11, the front elements 11 having a negative power and the rear elements 12 having a positive power. Zooming operation causes the front elements 11 to move along a track 111 and causes the rear elements 12 to move along a track 121. In any zoom stages, the rear elements 12 move for focusing in accordance with the subject distance so that the subject is formed on an imaging plane 13 in the focusing state. In case of a digital camera, a solid state imaging device is disposed at the position which is coincident with the imaging plane 13. On the other hand, in case of a camera wherein photography is carried out on a photographic film, the photographic film is disposed at the imaging plane 13.

Front elements 11' and rear elements 12', a track 111' of the front elements 11', and a track 121' of the rear elements 12', which are shown with a broken line, denote the front elements position, the rear elements position and the associated track positions, respectively, which are set up in such a manner that the conventional concept that when the zooming is carried out, an image taking apparatus is focused on the infinite-point, that is, with respect to the front elements, the above-mentioned formula (2), as set forth below, is satisfied, $$T_1 = Ha_1 + HH_1 + L + HH_2 + \frac{f_2(f_1 - L)}{f_1 + f_2 - L_1} \quad (2)$$

and with respect to the rear elements, the above-mentioned formula (20), as set forth below, is satisfied.

$$T_2 = Ha_2 + HH_2 + \frac{f_2(f_1 - L)}{f_1 + f_2 - L} \quad (20)$$

In this case, as explained above, there appears an area wherein focusing is impossible on a part of the zooming area.

To the contrary, according to the present embodiment, the front elements 11 and the rear elements 12 are disposed at the same positions as the front elements 11' and the rear elements 12' of the conventional example in the wide-angle edge (part (A) of FIG. 16) of the zoom lens, respectively. And the positions of the front elements 11 and the rear elements 12 are set up at the zoom stages other than the wide-angle edge in such a manner that the above-mentioned formulas (10) and (11), as set forth below, are satisfied.

$$T_1 = Ha_1 + HH_1 + L + HH_2 + \frac{f_2(f_1 - L)}{f_1 + f_2 - L} + \frac{f^2}{n - f} \quad (10)$$

$$T_2 = Ha_2 + HH_2 + \frac{f_2(f_1 - L)}{f_1 + f_2 - L} + \frac{f^2}{n - f} \quad (11)$$

According to the fourth embodiment (cf. embodiment 4, table 6, FIG. 11 and FIG. 12), the front elements 11 are disposed at the position extended forward more than the conventional example in all the zooming areas. In this case, since the front elements 11 are extended forward more than the conventional example, the whole length of the lens at the time of photography is extended by the corresponding and thus the lens barrel is also extended. Accordingly, there is a possibility that thickness of the lens barrel is thicker at the time of the storage.

In view of the foregoing, according to the fifth embodiment, with respect to the wide-angle edge (zoom stage Z1), which has an effect on the whole length of the lens, the front elements 11 and the rear elements 12 are disposed at the position of the formulas (10) and (11) in which an image taking apparatus is focused on the infinite-point. On the other hands, with respect to the zoom stage Z2 to Z10, the front elements 11 and the rear elements 12 are disposed at the position that the front elements 11 and the rear elements 12 are extended by $f^2/(n-f)$ more than the tracks 111' and 112' in the conventional example.

As shown in Table 2 and FIG. 2, with respect to the zoom stage Z1 as the wide-angle edge, even if the conventional example is concerned, it is possible to perform a focussing control over a range from the infinite-point to the closest distance. Accordingly, also in accordance with the fifth embodiment, it is possible to use the rear elements 12 for focusing at all the zoom stages. Further, in accordance with the fifth embodiment, it is possible to reduce the whole length of the lens at the time of photography and thereby contributing to reducing the lens barrel and also to compactness and thinning.

The fifth embodiment corresponds to the embodiment of a fourth zoom lens according to the present invention, in which the front elements 11 and the rear elements 12 are extended to a position that only the partial area including the direct magnification vicinity area, wherein the focusing is impossible in accordance with the conventional example, of the whole areas of zooming, satisfies the above-mentioned formulas (8) and (9).

According to the fifth embodiment too, in a similar fashion to that of the first embodiment, it is preferable that the upper limit of the formulas (14) and (15) is not exceeded.

Table 7 shows an example (embodiment 5) of the second embodiment. Also in the embodiment 5 shown in Table 7, characteristics of the lens elements are the same as those shown in Table 1. According to the embodiment 5, with respect to the zoom stage Z1, as shown in Table 7, the lateral magnification is −0.459 and is off from the direct magnification. Accordingly, even if the front elements 11 and the rear elements 12 are disposed at the same position as the conventional example (cf. Table 2 and FIG. 2), it is possible to use the rear elements 12 as the focus lens.

12, respectively, in the manner as explained referring to Table 7 and FIG. 16. Accordingly, the redundant explanation will be omitted.

Figure 17:
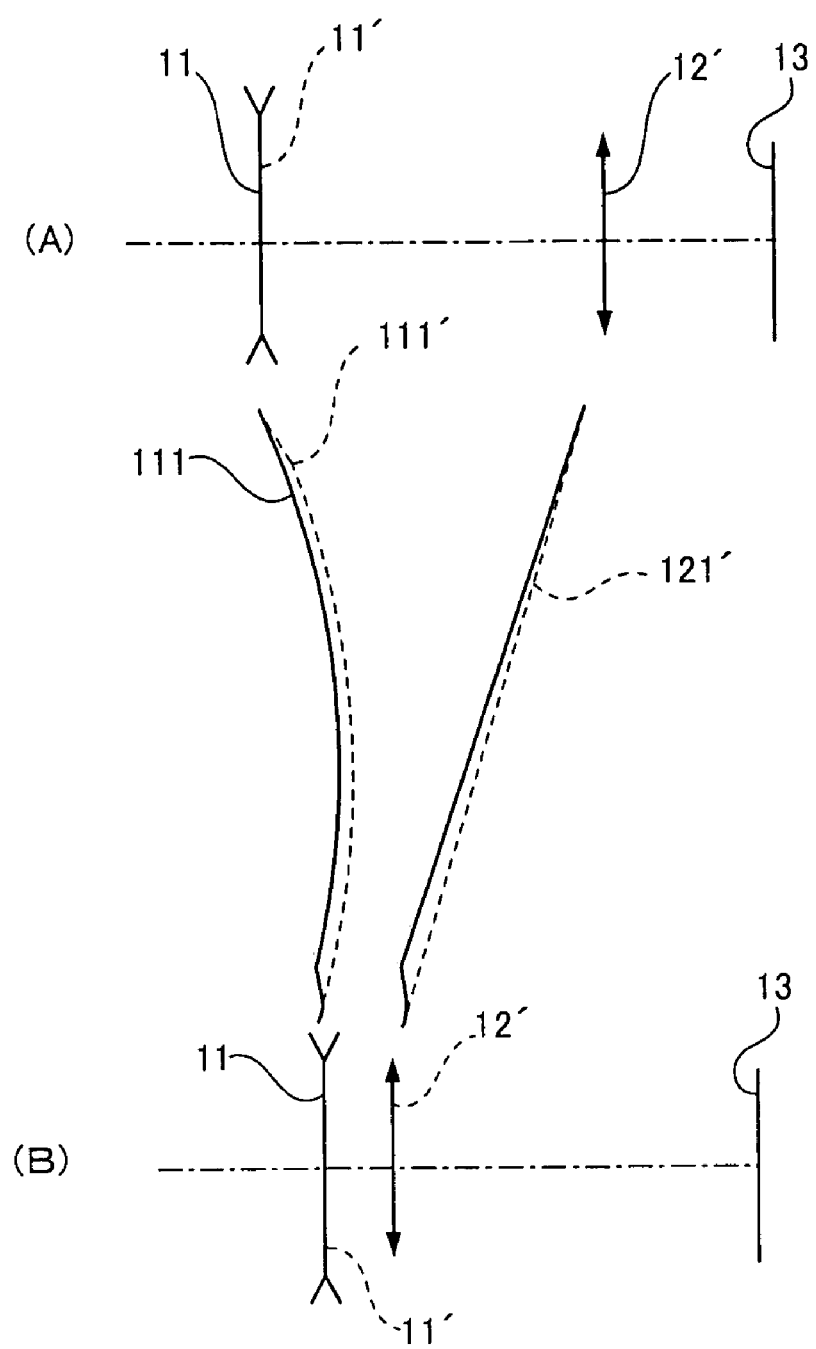
FIG. 17 is a view showing a zoom lens according to the sixth embodiment of the present invention.

FIG. 17 is a view showing a zoom lens according to the sixth embodiment of the present invention. Part (A) and part (B) of FIG. 10 show lens positions of the wide-angle edge and the telephoto edge of the zoom lens, respectively.

This zoom lens comprises, in a similar fashion to that of the respective embodiments as mentioned above, the front elements 11 having a negative power and the rear elements 12 having a positive power. Zooming operation causes the front elements 11 to move along a track 111 and causes the rear elements 12 to move along a track 121. In any zoom stages, the rear elements 12 move for focusing in accordance with the subject distance so that the subject is formed on an imaging plane 13 in the focusing state. In case of a digital camera, a solid state imaging device is disposed at the position which is coincident with the imaging plane 13. On the other hand, in case of a camera wherein photography is carried out on a photographic film, the photographic film is disposed at the imaging plane 13.

Front elements 11', a track 111' of the front elements 11', a rear elements 12' and a track 121' of the rear elements 12', which are shown with a broken line, denote the front elements position, the rear elements position and the associated track positions, respectively, which are set up in such a manner that the conventional concept that when the zooming is carried out, an image taking apparatus is focused on the infinite-point, that is, with respect to the front

TABLE 7

Lens elements positions and focusing movement
of the zoom lens of the embodiment 5
(only Z1 is the same as the conventional example)

|  | Z1 | Z2 | Z3 | Z4 | Z5 | Z6 | Z7 | Z8 | Z9 | Z10 |
|---|---|---|---|---|---|---|---|---|---|---|
| Focal length(reference position) | 5.70 | 6.20 | 6.78 | 7.45 | 8.24 | 9.18 | 10.33 | 11.78 | 13.65 | 16.13 |
| Focal length(inf) | 5.70 | 6.18 | 6.75 | 7.39 | 8.14 | 8.99 | 9.92 | 10.61 | 15.11 | 17.31 |
| Magnification of rear elements | −0.459 | −0.499 | −0.546 | −0.600 | −0.664 | −0.739 | −0.832 | −0.949 | −1.099 | −1.299 |
| Front element rear side main point-rear element front side main point | 20.19 | 18.39 | 16.63 | 14.94 | 13.30 | 11.72 | 10.17 | 8.65 | 7.17 | 5.74 |
| Front elements lens position | 36.44 | 35.11 | 33.85 | 32.72 | 31.76 | 30.98 | 30.42 | 30.15 | 30.3 | 31.04 |
| Rear elements lens position | 15.48 | 15.96 | 16.46 | 17.02 | 17.69 | 18.5 | 19.49 | 20.74 | 22.36 | 24.54 |
| Rear elements focusing movement (600 mm → inf) | 0.07 | −0.08 | −0.10 | −0.14 | −0.20 | −0.30 | −0.52 | −1.20 | 0.9 | 0.54 |

Incidentally, the digital camera, which is provided with the zoom lens according to the fifth embodiment, has the same structure as that shown in FIG. 1 and FIG. 8, except for a point that the zoom motor 141 and the focus motor 142, which are shown in FIG. 8, drive the front elements 11 and the rear elements 12 shown in FIG. 1 and the rear elements elements, the above-mentioned formula (2), as set forth below, is satisfied, $$T_1 = Ha_1 + HH_1 + L + HH_2 + \frac{f_2(f_1 - L)}{f_1 + f_2 - L_1} \quad (2)$$

and with respect to the rear elements, the above-mentioned formula (20), as set forth below, is satisfied.

$$T_2 = Ha_2 + HH_2 + \frac{f_2(f_1 - L)}{f_1 + f_2 - L} \quad (20)$$

In this case, as explained above, there appears an area wherein focusing is impossible on a part of the zooming area.

To the contrary, according to the present embodiment, the front elements 11 and the rear elements 12 are disposed at the same positions as the front elements 11' and the rear elements 12' of the conventional example in two points of the wide-angle edge (part (A) of FIG. 17) and the telephoto edge (part (B) of FIG. 17) of the zoom lens, respectively. And the positions of the front elements 11 and the rear elements 12 are set up at the zoom stages other than the wide-angle edge and the telephoto edge in such a manner that the above-mentioned formulas (10) and (11), as set forth below, are satisfied.

$$T_1 = Ha_1 + HH_1 + L + HH_2 + \frac{f_2(f_1 - L)}{f_1 + f_2 - L} + \frac{f^2}{n - f} \quad (10)$$

$$T_2 = Ha_2 + HH_2 + \frac{f_2(f_1 - L)}{f_1 + f_2 - L} + \frac{f^2}{n - f} \quad (11)$$

condition, there will occur a problem of time lag. In view of the foregoing, in case of the sixth embodiment as shown in FIG. 17, with respect to two points of the wide-angle edge (zoom stage Z1) shown in part (A) of FIG. 17 and the telephoto edge (zoom stage Z10) shown in part (B) of FIG. 17, the front elements 11 are disposed at the position satisfying the formulas (2) and (20) in a similar fashion to that of the conventional example. On the other hands, with respect to the zoom stage Z2 to Z9, the front elements 11 and the rear elements 12 are disposed at the positions that the front elements 11 and the rear elements 12 are extended by $f^2/(n-f)$ more than the track 111' of the front elements 11' in the conventional example, rather than the position satisfying the formulas (2) and (20).

Table 8 shows an example (embodiment 6) of the sixth embodiment. Also in the embodiment 6 shown in Table 8, characteristics of the lens elements are the same as those shown in Table 1. According to the embodiment 6, with respect to the zoom stage Z1, as shown in Table 2 and Table 7, the lateral magnification of the rear elements 12 is −0.459 and is off from the direct magnification. And also with respect to the zoom stage Z10, the lateral magnification of the rear elements 12 is −1.299 (it is the same as one shown in Table 2) and is off from the direct magnification. Accordingly, also with respect to the zoom stages Z1 and Z10, it is possible to focus an image taking apparatus on an arbitrary subject distance between the infinite-point and the closest distance using only the rear elements 12 as the focus lens group.

In case of the sixth embodiment, it is suitable for both the compactness and the tele-macro mode.

TABLE 8

Lens ellements positions and focusing movement of the zoom lens of the embodiment 6
(Z1 and Z10 are the same as the conventional example)

| | Z1 | Z2 | Z3 | Z4 | Z5 | Z6 | Z7 | Z8 | Z9 | Z10 |
|---|---|---|---|---|---|---|---|---|---|---|
| Focal length(reference position) | 5.70 | 6.20 | 6.78 | 7.45 | 8.24 | 9.02 | 10.13 | 11.52 | 13.29 | 16.13 |
| Focal length(inf) | 5.70 | 6.10 | 6.66 | 7.29 | 8.02 | 8.84 | 9.76 | 10.54 | 14.91 | 16.13 |
| Magnification of rear elements | −0.459 | −0.499 | −0.546 | −0.600 | −0.664 | −0.739 | −0.832 | −0.949 | −1.099 | −1.299 |
| Front element rear side main point-rear element front side main point | 20.19 | 18.39 | 16.63 | 14.94 | 13.30 | 11.72 | 10.17 | 8.65 | 7.17 | 5.74 |
| Front elements lens position | 36.44 | 35.11 | 33.85 | 32.72 | 31.76 | 30.98 | 34.42 | 30.15 | 30.3 | 30.60 |
| Rear elements lens position | 15.48 | 15.96 | 16.46 | 17.02 | 17.69 | 18.5 | 19.49 | 20.74 | 22.36 | 24.10 |
| Rear elements focusing movement (600 mm → inf) | 0.07 | −0.08 | −0.10 | −0.14 | −0.20 | −0.30 | −0.52 | −1.20 | 0.9 | −0.67 |

According to the embodiment 5 shown in Table 7, with respect to the wide-angle edge (zoom stage Z1), which has an effect on the whole length of the lens, the front elements 11 are left in the conventional position. In case of a camera having a tele-macro mode in which a macro-photography is performed in a state that a zoom lens is set in zooming on the telephoto edge, it is preferable that also with respect to the telephoto edge (zoom stage Z10), the front elements 11 are left in the conventional position. In case of the tele-macro, there is a need that the front elements 11 are extended greatly, and thus the focal length is large in change. Further, when the rear elements 12 are used for focusing in this In a similar fashion to that of the fifth embodiment, the sixth embodiment corresponds to the embodiment of a fourth zoom lens according to the present invention, in which the front elements 11 are extended to a position that only the partial area including the direct magnification vicinity area, wherein the focusing is impossible in accordance with the conventional example, of the whole areas of zooming, satisfies the above-mentioned formulas (8) and (9).

According to the sixth embodiment too, in a similar fashion to that of the fourth embodiment and the fifth embodiment, it is preferable that the upper limit of the formulas (14) and (15) is not exceeded.

Incidentally, the digital camera, which is provided with the zoom lens according to the sixth embodiment, has the same structure as that shown in FIG. 1 and FIG. 8, except for a point that the zoom motor 141 and the focus motor 142, which are shown in FIG. 8, drive the front elements 11 and the rear elements 12 shown in FIG. 1 and the rear elements 12, respectively, in the manner as explained referring to Table 8 and FIG. 17. Accordingly, the redundant explanation will be omitted.

Incidentally, in the above explanation, it is described that the closest distance is 600 mm. However, it is noted that the closest distance is not restricted to 600 mm, and can be optionally set.

Further, in the above explanation, there are described a zoom lens and a digital camera having the zoom lens. However, an image taking apparatus of the present invention is not restricted to the digital camera, and is broadly applicable to such a type of camera that photography is carried out on a silver halide film, a portable telephone having a camera function, and a PDA (Personal Data Assistant). An image taking apparatus of the present invention gives a generic name to equipment having a camera function.

As mentioned above, according to the present invention, it is possible to contribute to compactness and thinning by the use of two elements-retrofocus type of zoom lens, and also it is possible to use only the rear elements as the focusing lens elements in the whole areas of zooming.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. A zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein a track of the front elements by zooming is set up so that the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f_1^2}{m - f_1},$$

where a length from a top of the front elements on an optical axis to a front side main point of the front elements: $Ha_1$, a main point interval of the front elements: $HH_1$, a length from a rear side main point of the front elements to a front side main point of the rear elements where an air conversion is carried out on an optical member not included in the front elements and the rear elements: $L$, a main point interval of the rear elements: $HH_2$, a focal length of the front elements: $f_1$, a focal length of the rear elements: $f_2$, a length from the object at the time of near photography to the front side main point of the front elements where the air conversion is carried out on the optical member not included in the front elements: $m$, and a length from the top of the front elements on the optical axis to the imaging plane where the air conversion is carried out on the optical member not included in the front elements and the rear elements: $T_1$.

2. A zoom lens according to claim 1, wherein a track of the front elements by zooming is set up in such a manner that the front elements are disposed at a position that formulas set forth below are satisfied $$T_1 \geq Ha_1 + HH_1 + L + HH_2 + \frac{f_2(f_1 - L)}{f_1 + f_2 - L} + \frac{f_1^2}{m - f_1}$$

$$T_1 \leq Ha_1 + HH_1 + L + HH_2 + \frac{f_2(f_1 - L)}{f_1 + f_2 - L} - f_1.$$

3. A zoom lens according to claim 1, wherein a movement of only the rear elements, of the front elements and the rear elements, performs focusing.

4. A zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein a track of the front elements by zooming is set up in such a manner that of zooming areas, at a predetermined area including a predetermined direct magnification neighbor area wherein lateral magnification of the rear elements is direct magnification neighbor, the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f_1^2}{m - f_1},$$

and of the zooming areas, at a predetermined zooming point or area excepting the predetermined area, the front elements are disposed at a position that formulas set forth below are satisfied:

$$T_1 \geq Ha_1 + HH_1 + L + HH_2 + \frac{f_2(f_1 - L)}{f_1 + f_2 - L_1}$$

$$T_1 < Ha_1 + HH_1 + L + HH_2 + \frac{f_2(f_1 - L)}{f_1 + f_2 - L} + \frac{f_1^2}{m - f_1},$$

where a length from a top of the front elements on an optical axis to a front side main point of the front elements: $Ha_1$, a main point interval of the front elements: $HH_1$, a length from a rear side main point of the front elements to a front side main point of the rear elements where an air conversion is carried out on an optical member not included in the front elements and the rear elements: $L$, a main point interval of the rear elements: $HH_2$, a focal length of the front elements: $f_1$, a focal length of the rear elements: $f_2$, a length from the object at the time of near photography to the front side main point of the front elements where the air conversion is carried out on an optical member not included in the front elements: $m$, and a length from the top of the front elements on the optical axis to the imaging plane where the air conversion is carried out on the optical member not included in the front elements and the rear elements: $T_1$.

5. A zoom lens according to claim 4, wherein a track of the front elements by zooming is set up in such a manner that at the predetermined area, the front elements are disposed at a position that formulas set forth below are satisfied $$T_1 \geq Ha_1 + HH_1 + L + HH_2 + \frac{f_2(f_1 - L)}{f_1 + f_2 - L} + \frac{f_1^2}{m - f_1}$$

$$T_1 \leq Ha_1 + HH_1 + L + HH_2 + \frac{f_2(f_1 - L)}{f_1 + f_2 - L} - f_1.$$

6. A zoom lens according to claim 4, wherein a movement of only the rear elements, of the front elements and the rear elements, performs focusing.

7. A zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein tracks of the front elements and the rear elements by zooming are set up so that the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f^2}{n - f},$$

and the rear elements are disposed at a position that formula set forth below is satisfied:

$$T_2 \geq Ha_2 + HH_2 + \frac{f_2(f_1 - L)}{f_1 + f_2 - L} + \frac{f^2}{n - f},$$

where a length from a top of the front elements on an optical axis to a front side main point of the front elements: $Ha_1$,
a main point interval of the front elements: $HH_1$,
a length from a rear side main point of the front elements to a front side main point of the rear elements where an air conversion is carried out on an optical member not included in the front elements and the rear elements: L,
a main point interval of the rear elements: $HH_2$,
a length from a top of the rear elements on the optical axis to the front side main point of the rear elements: $Ha_2$,
a focal length of the front elements: $f_1$,
a focal length of the rear elements: $f_2$,
a focal length of a whole system comprising the front elements and the rear elements in zoom positions where the air conversion is carried out on the optical member interposed between the front elements and the rear elements: f,
a length from the object at the time of near photography to the front side main point of the whole system where the air conversion is carried out on the optical member not included in the whole system: n
a length from the top of the front elements on the optical axis to the imaging plane where the air conversion is carried out on the optical member not included in the front elements and the rear elements: $T_1$, and,
a length from the top of the rear elements on the optical axis to the imaging plane where the air conversion is carried out on the optical member not included in the rear elements; $T_2$.

8. A zoom lens according to claim 7, wherein tracks of the front elements and the rear elements by zooming are set up in such a manner that the front elements are disposed at a position that formulas set forth below are satisfied:

$$T_1 \geq Ha_1 + HH_1 + L + HH_2 + \frac{f_2(f_1 - L)}{f_1 + f_2 - L} + \frac{f^2}{n - f}$$

$$T_1 \leq Ha_1 + HH_1 + L + HH_2 + \frac{f_2(f_1 - L)}{f_1 + f_2 - L} - f,$$

and the rear elements are disposed at a position that formulas set forth below are satisfied $$T_2 \geq Ha_2 + HH_2 + \frac{f_2(f_1 - L)}{f_1 + f_2 - L} + \frac{f^2}{n - f}$$

$$T_2 \leq Ha_2 + HH_2 + \frac{f_2(f_1 - L)}{f_1 + f_2 - L} - f,$$

9. A zoom lens according to claim 7, wherein a movement of only the rear elements, of the front elements and the rear elements, performs focusing.

10. A zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane, wherein tracks of the front elements and the rear elements by zooming are set up in such a manner that of zooming areas, at a predetermined area including a predetermined direct magnification neighbor area wherein lateral magnification of the rear elements is direct magnification neighbor, the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f^2}{n - f},$$

and the rear elements are disposed at a position that formula set forth below is satisfied:

$$T_2 \geq Ha_2 + HH_2 + \frac{f_2(f_1 - L)}{f_1 + f_2 - L} + \frac{f^2}{n - f},$$

and of the zooming areas, at a predetermined zooming point or area excepting the predetermined area, the front elements are disposed at a position that formulas set forth below are satisfied $$T_1 \geq Ha_1 + HH_1 + L + HH_2 + \frac{f_2(f_1 - L)}{f_1 + f_2 - L_1}$$

-continued $$T_1 > Ha_1 + HH_1 + L + HH_2 + \frac{f_2(f_1 - L)}{f_1 + f_2 - L} + \frac{f^2}{n - f},$$

and the rear elements are disposed at a position that formulas set forth below are satisfied $$T_2 \geq Ha_2 + HH_2 + \frac{f_2(f_1 - L)}{f_1 + f_2 - L}$$

$$T_2 < Ha_2 + HH_2 + \frac{f_2(f_1 - L)}{f_1 + f_2 - L} + \frac{f^2}{n - f},$$

where a length from a top of the front elements on an optical axis to a front side main point of the front elements: $Ha_1$,
a main point interval of the front elements: $HH_1$,
a length from a rear side main point of the front elements to a front side main point of the rear elements where an air conversion is carried out on an optical member not included in the front elements and the rear elements: L,
a main point interval of the rear elements: $HH_2$,
a length from a top of the rear elements on the optical axis to a front side main point of the rear elements: $Ha_2$,
a focal length of the front elements: $f_1$,
a focal length of the rear elements: $f_2$,
a focal length of a whole system comprising the front elements and the rear elements in zoom positions where the air conversion is carried out on the optical member interposed between the front elements and the rear elements: f,
a length from the object at the time of near photography to the front side main point of the whole system where the air conversion is carried out on the optical member not included in the whole system: n
a length from the top of the front elements on the optical axis to the imaging plane where the air conversion is carried out on the optical member not included in the front elements and the rear elements: $T_1$, and,
a length from the top of the rear elements on the optical axis to the imaging plane where the air conversion is carried out on the optical member not included in the rear elements: $T_2$.

11. A zoom lens according to claim 10, wherein tracks of the front elements and the rear elements by zooming are set up in such a manner that at the predetermined area, the front elements are disposed at a position that formulas set forth below are satisfied:

$$T_1 \geq Ha_1 + HH_1 + L + HH_2 + \frac{f_2(f_1 - L)}{f_1 + f_2 - L} + \frac{f^2}{n - f}$$

$$T_1 \leq Ha_1 + HH_1 + L + HH_2 + \frac{f_2(f_1 - L)}{f_1 + f_2 - L} - f,$$

and the rear elements are disposed at a position that formulas set forth below are satisfied $$T_2 \geq Ha_2 + HH_2 + \frac{f_2(f_1 - L)}{f_1 + f_2 - L} + \frac{f^2}{n - f}$$

$$T_2 \leq Ha_2 + HH_2 + \frac{f_2(f_1 - L)}{f_1 + f_2 - L} - f.$$

12. A zoom lens according to claim 6, wherein a movement of only the rear elements, of the front elements and the rear elements, performs focusing.

13. An image taking apparatus comprising an imaging device and a zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane,
wherein a track of the front elements by zooming is set up so that the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f_1^2}{m - f_1},$$

where a length from a top of the front elements on an optical axis to a front side main point of the front elements: $Ha_1$,
a main point interval of the front elements: $HH_1$,
a length from a rear side main point of the front elements to a front side main point of the rear elements where an air conversion is carried out on an optical member not included in the front elements and the rear elements: L,
a main point interval of the rear elements: $HH_2$,
a focal length of the front elements: $f_1$,
a focal length of the rear elements: $f_2$,
a length from the object at the time of near photography to the front side main point of the front elements where the air conversion is carried out on the optical member not included in the front elements: m, and
a length from the top of the front elements on the optical axis to the imaging plane where the air conversion is carried out on the optical member not included in the front elements and the rear elements: $T_1$.

14. An image taking apparatus comprising an imaging device and a zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane,
wherein a track of the front elements by zooming is set up in such a manner that of zooming areas, at a predetermined area including a predetermined direct magnification neighbor area wherein lateral magnification of the rear elements is direct magnification neighbor, the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f_1^2}{m - f_1},$$

and of the zooming areas, at a predetermined zooming point or area excepting the predetermined area, the front elements are disposed at a position that formulas set forth below are satisfied:

$$T_1 \geq Ha_1 + HH_1 + L + HH_2 + \frac{f_2(f_1 - L)}{f_1 + f_2 - L_1}$$

$$T_1 < Ha_1 + HH_1 + L + HH_2 + \frac{f_2(f_1 - L)}{f_1 + f_2 - L} + \frac{f^2}{n - f},$$

where a length from a top of the front elements on an optical axis to a front side main point of the front elements: $Ha_1$,
a main point interval of the front elements: $HH_1$,
a length from a rear side main point of the front elements to a front side main point of the rear elements where an air conversion is carried out on an optical member not included in the front elements and the rear elements: $L$,
a main point interval of the rear elements: $HH_2$,
a focal length of the front elements: $f_1$,
a focal length of the rear elements: $f_2$,
a length from the object at the time of near photography to the front side main point of the front elements where the air conversion is carried out on the optical member not included in the front elements: $m$, and
a length from the top of the front elements on the optical axis to the imaging plane where the air conversion is carried out on the optical member not included in the front elements and the rear elements: $T_1$.

15. An image taking apparatus comprising an imaging device and a zoom lens of two elements, which comprises a front elements lens having a negative refractivity and a rear elements lens having a positive refractivity
a focal length of a whole system comprising the front elements and the rear elements in zoom positions where the air conversion is carried out on the optical member interposed between the front elements and the rear elements: $f$,
a length from the object at the time of near photography to the front side main point of the whole system where the air conversion is carried out on the optical member not included in the whole system: $n$
a length from the top of the front elements on the optical axis to the imaging plane where the air conversion is carried out on the optical member not included in the front elements and the rear elements: $T_1$, and,
a length from the top of the rear elements on the optical axis to the imaging plane where the air conversion is carried out on the optical member not included in the rear elements: $T_2$.

16. An image taking apparatus comprising an imaging device and a zoom lens of two elements, which comprises a front elements lens having a negative refractivity and a rear elements lens having a positive refractivity in sequence from an object side, in which an object of an arbitrary distance between infinite-point and a predetermined closest distance is formed on an imaging plane,
wherein tracks of the front elements and the rear elements by zooming are set up in such a manner that of zooming areas, at a predetermined area including a predetermined direct magnification neighbor area wherein lateral magnification of the in sequence from an object side, in which an object of an arbitrary distance between infinite-point and a predetermined closest distance is formed on an imaging plane,
wherein tracks of the front elements and the rear elements by zooming are set up so that the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f^2}{n - f},$$

and the rear elements are disposed at a position that formula set forth below is satisfied:

$$T_2 \geq Ha_2 + HH_2 + \frac{f_2(f_1 - L)}{f_1 + f_2 - L} + \frac{f^2}{n - f},$$

where a length from a top of the front elements on the optical axis to the front side main point of the front elements: $Ha_1$,
a main point interval of the front elements: $HH_1$,
a length from a rear side main point of the front elements to a front side main point of the rear elements where an air conversion is carried out on an optical member not included in the front elements and the rear elements: $L$,
a main point interval of the rear elements: $HH_2$,
a length from a top of the rear elements on the optical axis to the front side main point of the rear elements: $Ha_2$,
a focal length of the front elements: $f_1$,
a focal length of the rear elements: $f_2$, rear elements is direct magnification neighbor, the front elements are disposed at a position that formula set forth below is satisfied:

$$T_1 \geq Ha_1 + HH_1 + L + HH_2 + \frac{f_2(f_1 - L)}{f_1 + f_2 - L} + \frac{f^2}{n - f},$$

and the rear elements are disposed at a position that formula set forth below is satisfied $$T_2 \geq Ha_2 + HH_2 + \frac{f_2(f_1 - L)}{f_1 + f_2 - L} + \frac{f^2}{n - f},$$

and of the zooming areas, at a predetermined zooming point or area excepting the predetermined area, the front elements are disposed at a position that formulas set forth below are satisfied:

$$T_1 \geq Ha_1 + HH_1 + L + HH_2 + \frac{f_2(f_1 - L)}{f_1 + f_2 - L_1}$$

$$T_1 < Ha_1 + HH_1 + L + HH_2 + \frac{f_2(f_1 - L)}{f_1 + f_2 - L} + \frac{f_1^2}{m - f_1},$$

and the rear elements are disposed at a position that formulas set forth below are satisfied $$T_2 \geq Ha_2 + HH_2 + \frac{f_2(f_1 - L)}{f_1 + f_2 - L}$$

-continued $$T_2 < Ha_2 + HH_2 + \frac{f_2(f_1 - L)}{f_1 + f_2 - L} + \frac{f^2}{n - f},$$

where a length from a top of the front elements on an optical axis to a front side main point of the front elements: $Ha_1$,
a main point interval of the front elements: $HH_1$,
a length from a rear side main point of the front elements to a front side main point of the rear elements where an air conversion is carried out on an optical member not included in the front elements and the rear elements: L,
a main point interval of the rear elements: $HH_2$,
a length from a top of the rear elements on the optical axis to a front side main point of the rear elements: $Ha_2$,
a focal length of the front elements: $f_1$,
a focal length of the rear elements: $f_2$,
a focal length of the whole system comprising the front elements and the rear elements in zoom positions where the air conversion is carried out on the optical member interposed between the front elements and the rear elements: f,
a length from the object at the time of near photography to the front side main point of the whole system where the air conversion is carried out on the optical member not included in the whole system: n
a length from the top of the front elements on the optical axis to the imaging plane where the air conversion is carried out on the optical member not included in the front elements and the rear elements: $T_1$, and,
a length from the top of the rear elements on the optical axis to the imaging plane where the air conversion is carried out on the optical member not included in the rear elements: $T_2$.

* * * * *